June 14, 1960  F. S. THORNHILL  2,940,830
METHOD OF PREPARING SILICA PIGMENTS
Filed Aug. 23, 1955  17 Sheets-Sheet 1

INVENTOR
FRED S. THORNHILL
Oscar L. Spencer
ATTORNEY

June 14, 1960  F. S. THORNHILL  2,940,830
METHOD OF PREPARING SILICA PIGMENTS
Filed Aug. 23, 1955  17 Sheets-Sheet 5

INVENTOR
FRED S. THORNHILL
Oscar L. Spencer
ATTORNEY

June 14, 1960 — F. S. THORNHILL — 2,940,830
METHOD OF PREPARING SILICA PIGMENTS
Filed Aug. 23, 1955 — 17 Sheets-Sheet 7

INVENTOR
FRED S. THORNHILL
ATTORNEY

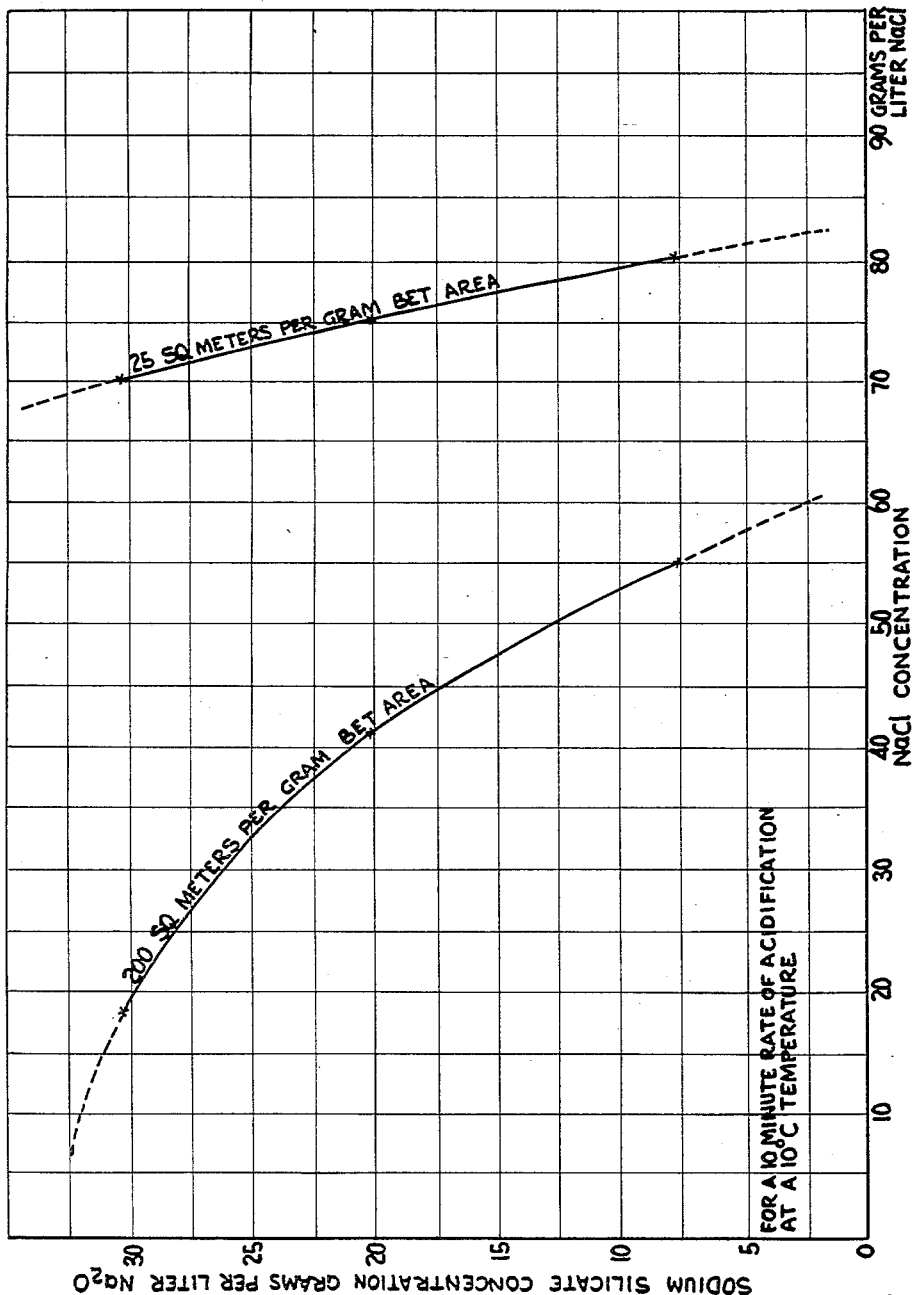

United States Patent Office 2,940,830
Patented June 14, 1960

2,940,830
METHOD OF PREPARING SILICA PIGMENTS

Fred S. Thornhill, New York, N.Y., assignor to Columbia-Southern Chemical Corporation, a corporation of Delaware Filed Aug. 23, 1955, Ser. No. 533,043

30 Claims. (Cl. 23—182)

This invention relates to finely divided precipitated silica which is suitable as a reinforcing pigment in rubber compositions and which also is useful in other fields. The invention further relates to methods of producing such silica.

Prior to the present invention it was known that silica could be prepared by reaction of alkali metal silicate with acids. The silica products prepared according to such methods are highly absorptive and are useful in several ways, particularly in numerous catalytic processes. Such silica is a comparatively hard product, even when finely divided, and is extremely porous. It is commonly recognized in the art as a "gel."

Such silicas usually have surface areas in the range of 300 to 800 square meters per gram.

The production of finely divided silica in a form suitable for use as a rubber reinforcing pigment has been considered desirable for many years, and a number of processes of producing silica for this purpose have been suggested. Silica compositions which have been investigated for this purpose have been prepared by decomposition or oxidation of vaporized silicon-containing compositions, such as ethyl silicate or silicon tetrachloride. Unfortunately, the silica products obtained in this manner are so expensive that they have never achieved significant commercial success except for certain specialized limited applications.

Attempts to prepare finely divided silica by direct precipitation processes from alkali metal silicates have, in general, resulted in the production either of unduly coarse products or of the gels or powders of high surface area referred to above. Neither of these products satisfactorily reinforces rubber although they may be used as fillers or extenders.

A further difficulty which I have encountered in the precipitation of silica from alkali metal silicate solution has been a serious irregularity in the silica thus obtained, portions of the same batch being coarse while others are fine and still others comprising a mixture of coarse and fine products. This is particularly true when batches of silica of substantial size are produced.

According to this invention a novel method has been provided for producing a satisfactory pigment. By practicing this novel method, several new and useful pigments have been provided. Moreover, silica which is very uniform in particle size is thus obtained.

To achieve the properties desired, it is essential that silica be precipitated under conditions such that the surface area of the pigment recovered from the resulting slurry has a surface area within a suitable range. In order to obtain a satisfactory rubber pigment, the precipitated silica should have an average ultimate particle size of 0.015 to 0.04 micron, preferably about 0.02 to 0.035 micron. Such a product normally should have a surface area of 75 to 200 square meters per gram.

Surface area alone may not be an accurate measurement for determination of particle size since coarse, porous pigments may have a high surface area. However, it corresponds roughly to particle size in the ultimate particle size range of 0.015 to 0.05 micron. Moreover, for silica having substantially the same particle size, relatively high surface area indicates relatively high porosity.

By following procedures herein contemplated, silica which is such an effective rubber reinforcing pigment that when such silica is properly compounded in GR-S rubber compositions and the products vulcanized, vulcanized rubber products having tensile strengths above 2400, and frequently 2800 to 3500, pounds per square inch and even higher are obtained. The tear strengths of such products range above about 150 pounds per inch thickness, frequently being in the range of 25 to 350 pounds per inch thickness or even higher. Moreover, paper containing silica in the surface area range of 25 to 75 square meters per gram and prepared according to my invention has an opacity of 79 to 80 or even higher, measured according to standard methods.

To obtain precipitation of pigmentary silica having a surface area of 25 to 200 square meters per gram, I have found that it is necessary to conduct the reaction of acid with sodium silicate under conditions which must be carefully correlated. Among the conditions of operation which must be observed are the following:

(1) $SiO_2$ concentration of the alkali metal silicate solution.

(2) Concentration of soluble alkali metal salt of a strong acid (such as sodium chloride) in the silicate solution.

(3) Temperature of reaction.

(4) Rate of addition of acid to the solution.

(5) Ratio of $SiO_2$ to $Na_2O$ in the silicate.

I have found that silica having an average ultimate particle size below about 0.1 micron, preferably below 0.05 micron, and a surface area of 25 to 200 square meters per gram may be precipitated by controlling the rate of addition of acid to alkali metal silicate in proper correlation with the silicate concentration, the temperature, and the alkali metal salt concentration. The surface area range of 25 to 200 square meters per gram refers to that of silica which, after precipitation, is heat treated by boiling in aqueous medium at a pH above 5, usually at pH 7, for one to two hours, and recovering and drying the silica. It is necessary to confine such surface area determination to silica thus stabilized because unstabilized silica exhibits variable surface area depending upon numerous factors, including the pH of the slurry from which it is recovered. Thus, it has been found that as acid is added beyond a slurry pH of 7, the surface area of the precipitated silica rises. This indicates an increase in porosity rather than an increase in particle size of the silica. Such porosity increase is objectionable when the silica is used in rubber. In other uses, such as in insecticides, avoidance of this porosity is less important. If the heat treatment is conducted at a pH below about 5, the surface area is unduly high and the heat treatment herein contemplated is ineffective. Likewise, if the silica as initially precipitated is substantially above 200 square meters per gram, heat treatment does not achieve the desired result. However, silica precipitated in a particle size range which exhibits a surface area of 25 to 200 square meters per gram can be stabilized by heating at a pH above 5. Even when some increase in surface area s caused by acidifying beyond pH 7 but above pH5, heating as herein contemplated overcomes this increase and brings the surface area back into range.

Widely different products are produced using widely different rates of acidification of sodium silicate. Thus, where sodium silicate is added to an excess of acid, neutralization of the silicate is essentially instantaneous. Such a process produces gel which is of little value as a paper or rubber pigment.

For a predetermined silica concentration, sodium chloride concentration, and temperature of reaction, pigmentary silica (silica precipitated in finely divided, discrete particles having the desired size) can be precipitated if the rate of acid addition is properly adjusted. This rate is determined by the other conditions.

Thus, where a solution of $Na_2O(SiO_2)_{3.3}$ containing 28 grams of $SiO_2$ per liter and 20.7 grams per liter of NaCl was treated with carbon dioxide at 25° C., the product had a surface area of 344 square meters per gram when the slurry was carbonated to a pH of 7 in 20 minutes. On the other hand, when this time of acidification was increased to 1440 minutes, the surface area fell to 166 square meters per gram, a quite acceptable value. Moreover, by increasing the NaCl content to 53.9 grams per liter, a pigment having a surface area of 112.5 can be obtained with only 20 minutes' acidification time. Thus, the rate of acidification may range from 5 to 2880 minutes or longer, so long as the other conditions are properly adjusted.

The sodium silicate used normally should have the composition $Na_2O(SiO_2)_x$ where $x$ is 2 or above, usually 2 to 4 including fractional numbers, preferably in the range of 3 to 4. While sodium monosilicate may be used, the large amount of acid required to neutralize compositions wherein the ratio of $SiO_2$ to $Na_2O$ is less than 2 makes the process economically objectionable. In producing silica having a particle size of 0.01 to 0.05 micron and a surface area of 75 to 200 square meters per gram, silicate solutions containing about 10 to 100 grams per liter of $SiO_2$ are preferably subjected to acid neutralization, particularly when a particle size below 0.05 micron is desirable. More concentrated solutions usually are unsuitable in such cases unless dilute acids are used, in which case the water of the acid dilutes the reaction mixture to an $SiO_2$ content in this range.

While silica can be precipitated from a solution containing 150 grams per liter $SiO_2$ or even above, the slurry resulting from solutions containing in excess of 150 grams of $SiO_2$ per liter normally are so viscous that it is difficult or even impossible to process when the silica precipitated has a particle size of 0.05 micron. When a coarser silica is precipitated, more concentrated alkali metal silicate may be used. Precipitation of silica from solutions containing less than 10 grams per liter of $SiO_2$, for example, as low as 5 grams of $SiO_2$ per liter, can be effected. However, the handling of such dilute solutions is expensive.

The problem of producing viscous suspensions is less complex when coarser silica in the surface area range of 25 to 50 square meters per gram and/or a particle size of 0.05 to 0.4 micron is produced. In such case, solutions containing as much as 150 to 175 grams per liter of $SiO_2$ may be used.

The solution may or may not contain an alkali metal salt of a strong acid, i.e. an acid at least as strong as sulphuric acid, depending upon the temperature of precipitation and the rate at which the acid is added. In general, the amount of such salt, if present, may range from 5 to as high as about 80 grams per liter or higher. However, where the rate of addition of acid is in excess of about 20 to 30 minutes, the amount of alkali metal salt normally should be in the range of 5 to 50 grams thereof per liter. Typical salts used in such concentrations in the sodium silicate are sodium chloride, sodium sulphate, potassium sulphate or chloride, and other like essentially neutral salts.

In the practice of this process, acid or acidic material is added at a controlled rate to the sodium silicate solution. Precipitation of the silica usually begins after about 30 percent of the acid required to neutralize the $Na_2O$ content of the alkali metal silicate has been added. Precipitation of the silica is essentially complete after about 40 to 70 percent of the theoretical amount of acid has been added. Generally, precipitation begins when the ratio of $SiO_2$ to $Na_2O$ is about 5, and appears to be substantially completed when the $SiO_2$ to $Na_2O$ ratio is about 10. Hence, where the graps in the accompanying drawings (discussed below) show a particular time of carbonation, for example, 120 minutes, it is only necessary to observe the rate for about the first half (in this case, 60 minutes) of the time indicated. Thereafter, the rate of addition of acidic material may be increased. The amount of acid used, however, normally is not substantially less than the stoichiometric amount required to react with the $Na_2O$ of the sodium silicate to produce the neutral or normal salt as distinguished from the acid salt, i.e. in the case of carbonic acid, the amount required to produce sodium carbonate as distinguished from sodium bicarbonate.

It is found preferable to conduct the acidification of the silicate using carbon dioxide or an acid salt thereof, such as sodium bicarbonate. With this acid, the ranges of conditions at which optimum products may be obtained are wider and the results obtained have been observed to me more reproducible. Moreover, certain other advantages accrue as will become apparent hereinafter.

However, other acids or acidic materials which are water soluble and which may be used include: hydrochloric acid, sulphuric acid, phosphoric acid, sulphurous acid, nitric acid, and acetic acid, as well as the acid or partially neutralized alkali metal salts of such acids, such as sodium bicarbonate, ammonium bicarbonate, sodium acid sulphate, disodium acid phosphate, and the like. Any other acidic material which reacts with alkali metal silicate to neutralize the alkali thereof also may be used. Gaseous acids or acid anhydrides such as $SO_2$, HCl, $H_2S$, $CO_2$, chlorine, and the like can be used most readily since problems which arise, due to dilution which occurs when aqueous acidic solutions are used, are not encountered. Normally, the acids used are mineral acids or their acidic salts although any acid or acidic material capable of reacting with aqueous alkali can be used.

Fig. 1 is a two-dimensional development of a three-dimensional graph illustrating the conditions of rate of acidification, NaCl concentration, and temperature necessary to precipitate silica of 25 to 200 square meters per gram, respectively, from sodium silicate solutions containing about 8.3, 20.3, and 30.45 grams per liter of $Na_2O$, respectively, as the sodium silicate $Na_2O \cdot (SiO_2)_x$, where $x$ ranges from 3.28 to 3.45. These $Na_2O$ concentrations correspond to $SiO_2$ concentrations of about 25, 67, and 100 grams, respectively, of $SiO_2$ per liter.

Fig. 2 is a two-dimensional development of a three-dimensional graph illustrating the conditions of rate of acidification, NaCl concentration, and temperature necessary to precipitate silica of 50 and 175 square meters per gram, respectively, from sodium silicate solutions containing 8.3, 20.3, and 30.45 grams per liter of $Na_2O$, respectively, as the sodium silicate $Na_2O \cdot (SiO_2)_x$, where $x$ ranges from 3.28 to 3.45.

Figure 1:
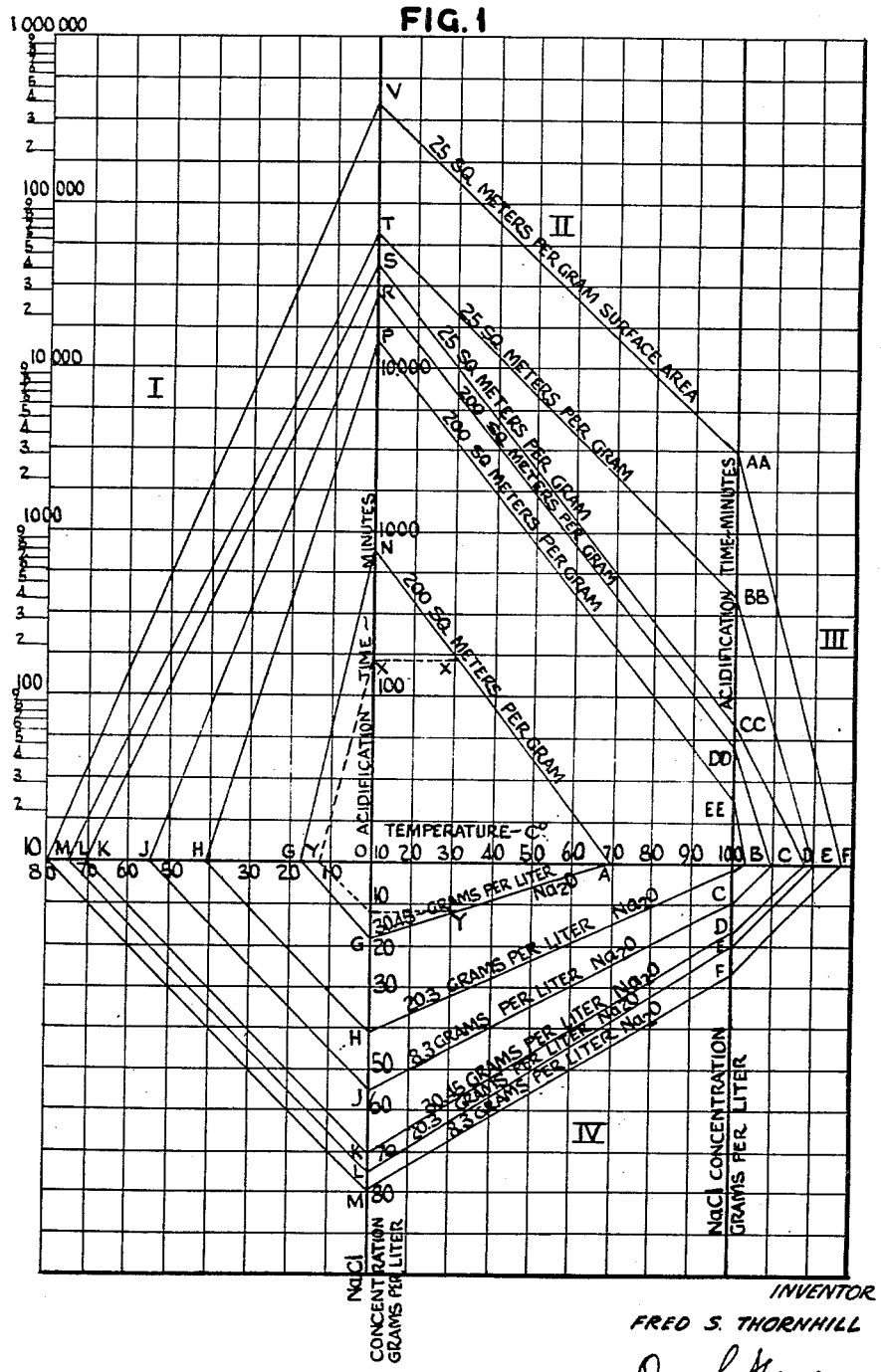

Referring to Fig. 1, there are illustrated three vertical planes I, II, and III, respectively, and one horizontal plane IV of a three-dimensional graph in which the horizontal axis is line OAB, the two vertical axes are lines ONPRSTV and BEEDDCCBBAA, and the two perpendicular lines are lines OGHJKLM and BCDEF. The horizontal axis denotes the temperature in degree centigrade (10, 20, 30, 40, 50, 60, 70, 80, 90, and 100° C.) at which the acid is added to the sodium silicate solution. The Y axes are logarithmic scales which denote the time in minutes required to add an amount of the acid sufficient to neutralize the sodium silicate and produce the neutral salt as distinguished from the acid salt, i.e., sodium carbonate as distinguished from sodium bicarbonate. This amount is called the theoretical or stoichiometric amount.

Plane I is a graph showing how the NaCl or like salt concentration must be varied at a temperature of about 10° C. with variation of the time in which the theoretical amount of acid is added to sodium silicate in order to obtain silica of 25 and 200 square meters per gram at several sodium silicate concentrations. Since the radio of $Na_2O$ to $SiO_2$ in such silicate is substantially 3.33 and titration for $Na_2O$ is readily accomplished, it is convenient to state the silicate concentration in terms of the grams of $Na_2O$ therein per liter of solution. Moreover, the rate of neutralization of the $Na_2O$ is the important factor. The silicate concentrations used corresponded to 30.45, 20.3, and 8.3 grams of $Na_2O$ per liter of solution which was treated. This corresponds to about 100, 67, and 25 grams of $SiO_2$ per liter, respectively. The corresponding family of conditions for intermediate silica concentrations may be determined readily by interpolation.

Plane II is a graph showing how the temperature must be varied with acidification rate when no NaCl or like salt is initially present in order to obtain silica of 25 and 200 square meters per gram surface area at the above stated silicate concentrations.

Plane III is a graph showing how the initial sodium chloride concentrations must be controlled with variation of the acidification rate at these silicate concentrations and at 100° C. in order to prepare such silica.

The perpendicular axes denote the concentration of sodium chloride present in the sodium silicate in terms of grams (10, 20, 30, 40, 60, 70, and 80 grams) of NaCl per liter of solution.

Plane IV is a graph showing the variation of initial NaCl concentration required with variation of temperature of acidification, at an acidification rate of 10 minutes, in order to produce silica of 25 and 200 square meters per gram surface area at silicate concentrations of 8.3, 20.3, and 30.45 grams of $Na_2O$ per liter.

Thus, line GA sets forth the conditions at which silica having a surface area of 200 square meters per gram may be obtained by reacting a solution of sodium silicate of the composition referred to in Fig. 1 and having a silicate concentration corresponding to 30.45 grams per liter of $Na_2O$, with the theoretical amount of acid being added in 10 minutes at the various NaCl contents, ranging from zero to about 18 grams per liter, and at temperatures from about 10 to 70° C. With the same acidification time (10 minutes), conditions within the area GAOG produce silica of higher surface area.

Conditions in plane IV beyond the boundary GA produce silica of lower surface area.

Line KD portrays conditions at which silica having an area of 25 square meters per gram may be obtained at 10 minutes' acidification time and a silicate concentration of 30.45 grams per liter of $Na_2O$. Hence, if one uses this acidification time and silicate concentration, silica having surface areas from 25 to 200 square meters per gram is produced when the conditions of NaCl and temperature are substantially within the area GADKG.

As shown in Fig. 1, these permissible ranges change as the time of neutralization is increased. The effect of this change upon conditions for a silicate concentration of 30.45 grams per liter of $Na_2O$ when no NaCl is initially present is shown by line AN. This line shows that as the time of acidification is increased, the temperature of the silicate solution during acidification may be decreased in the proportion indicated. Hence, at point N the surface area is 200 even when the salt concentration is zero, if the acidification rate is substantially 750 minutes and the temperature of the solution being acidified is held at 10° C. Lower acidification rates at the same temperatures and salt concentration produce higher surface areas, as previously brought out.

In like manner, line CCS shows the change in the conditions which produce a surface area of 25 square meters per gram using the silicate concentration corresponding to 30.45 grams per liter of $Na_2O$ as the acidification time rises from 10 minutes to about 45,000 minutes, no salt being initially present.

Figure 3:
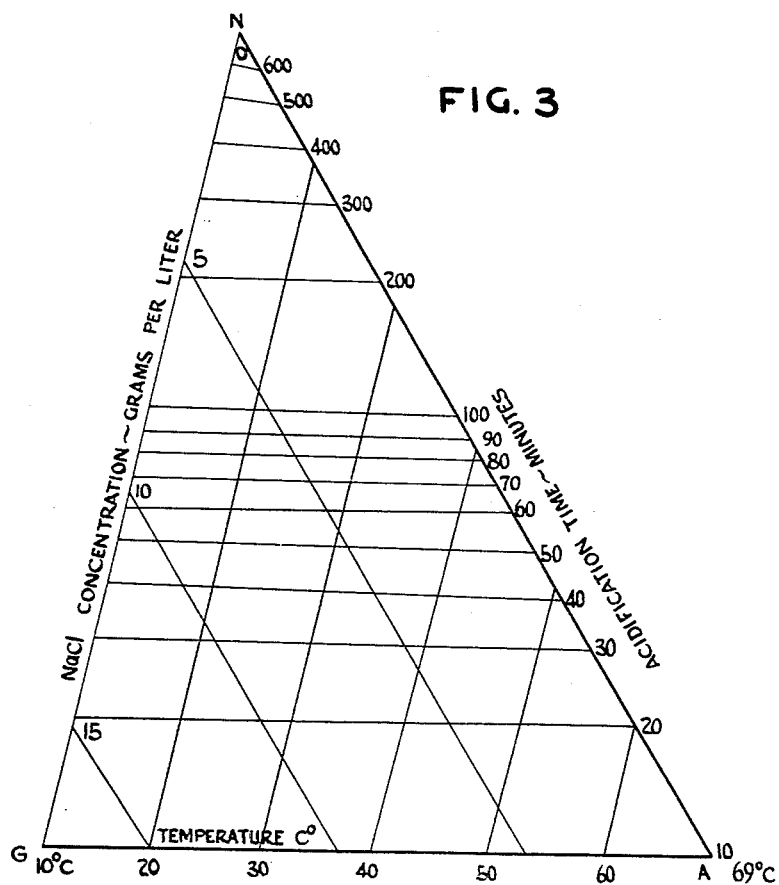
Fig. 3 illustrates the plane GANG shown in Fig. 1. This plane shows the conditions at which silica having a surface area of 200 square meters per gram can be precipitated from a solution of sodium silicate of the kind mentioned with reference to Fig. 1 at a concentration of 30.45 grams per liter of $Na_2O$.
Figure 6:
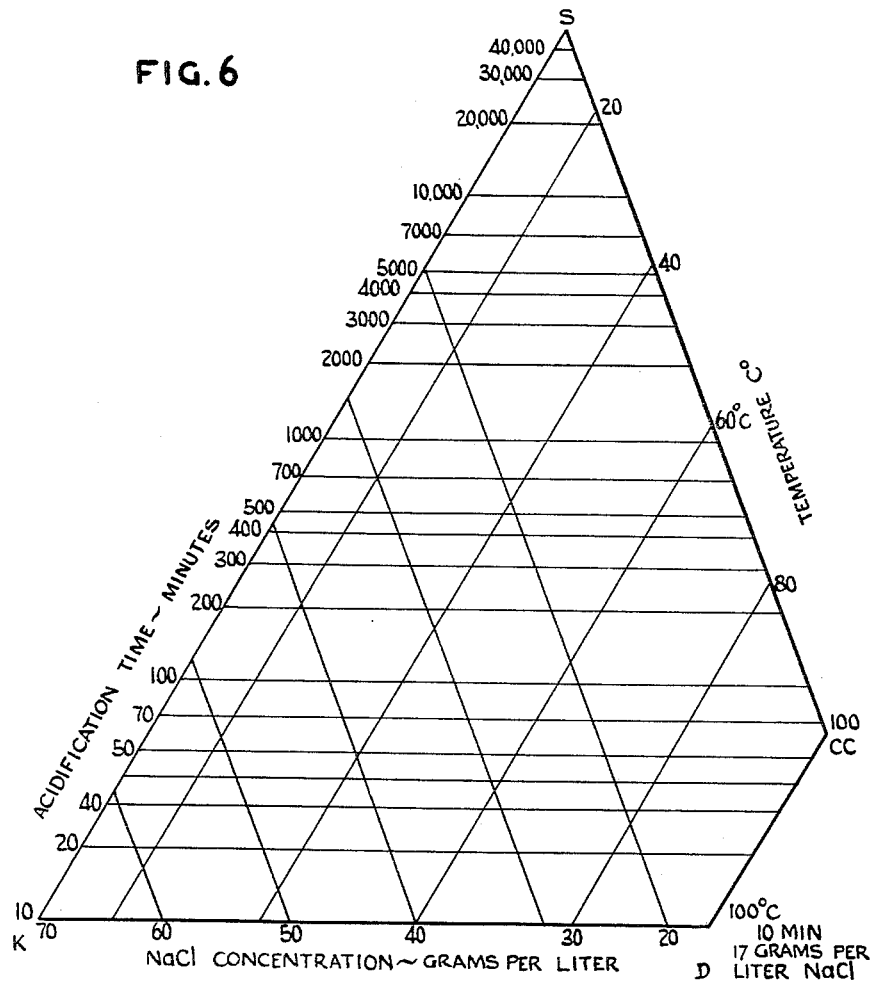
Fig. 6 illustrates the plane KDCCSK shown in Fig. 1 and showing conditions under which silica having a surface area of 25 square meters per gram can be precipitated from a solution of sodium silicate of the kind mentioned with reference to Fig. 1 at a concentration corresponding to 30.45 grams per liter of $Na_2O$.

The various sets of conditions at which silica of surface area of 25 to 200 square meters per gram, inclusive, may be prepared with variation of time, salt concentration, and temperature, come within the volume bounded by the plane GANG illustrated by Fig. 3 and the plane KDCCSK illustrated by Fig. 6. This volume is shown in perspective in Fig. 15.

Fig. 3 illustrates the plane bounded by lines GANG shown in Fig. 1 at which silica of 200 square meters per gram is produced. Fig. 6 illustrates the plane bounded by lines KDCCSK shown in Fig. 1 at which silica of 25 square meters per gram is produced. That is, in order to produce silica of surface area of 25 to 200 square meters per gram at the stated silicate concentration, it is necessary to hold the conditions between the two planes as shown in Fig. 15.

Figure 4:
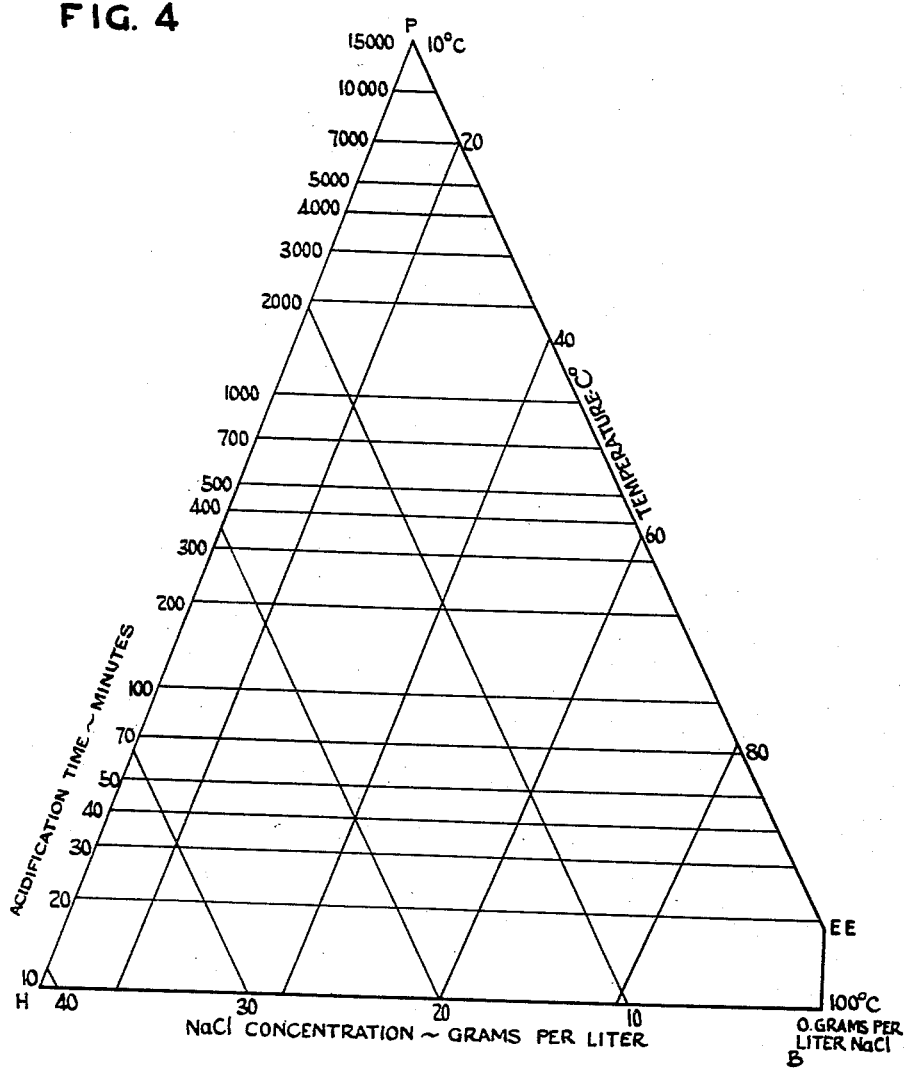
Fig. 4 illustrates the plane HBEEPH shown in Fig. 1 and delineates the conditions for precipitation of silica of a surface area of 200 square meters per gram which corresponds to an $Na_2O$ content of 20.3 grams per liter of $Na_2O$.
Figure 5:
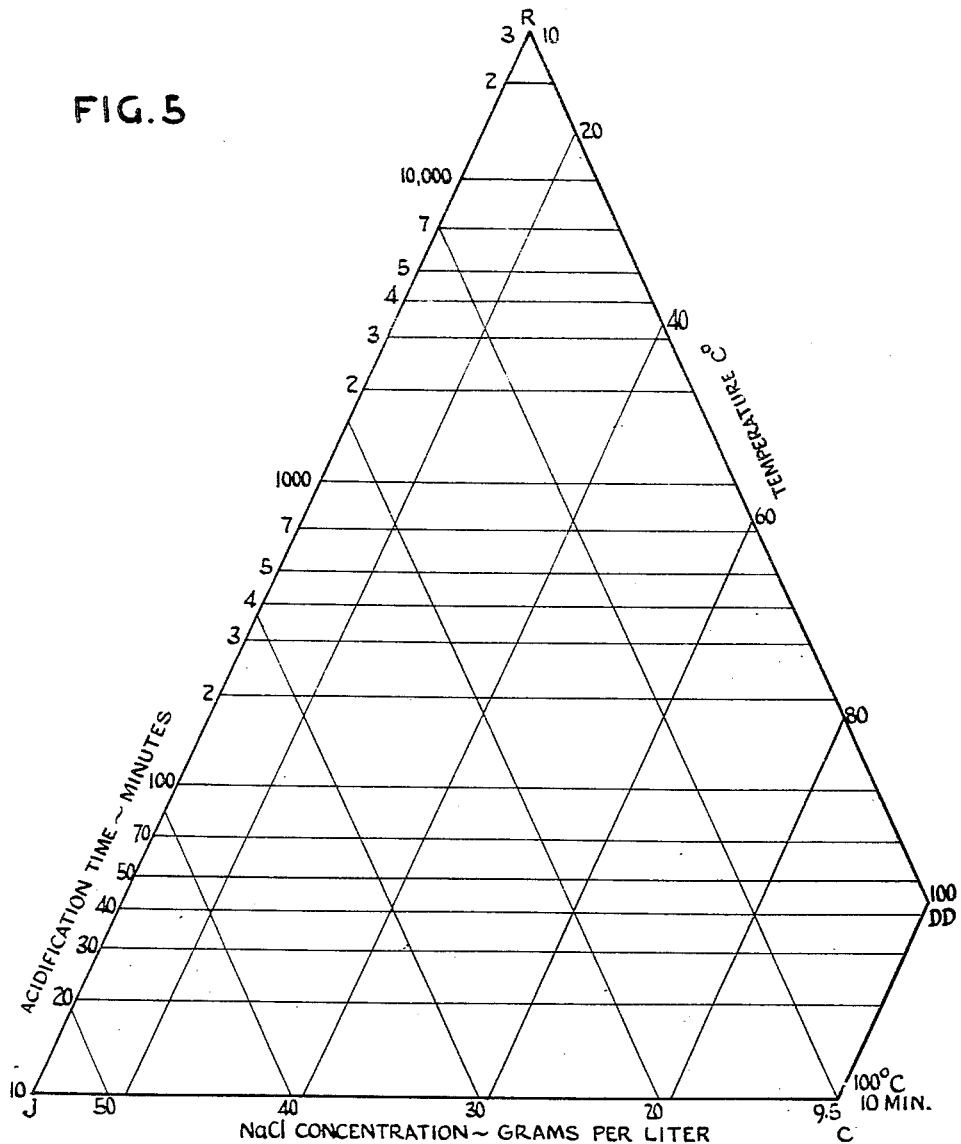
Fig. 5 illustrates the plane JCDDRJ shown in Fig. 1, which plane is of the type described with reference to Fig. 3 except that the sodium silicate concentration corresponds to an $Na_2O$ content of 8.3 grams per liter of $Na_2O$.
Figure 7:
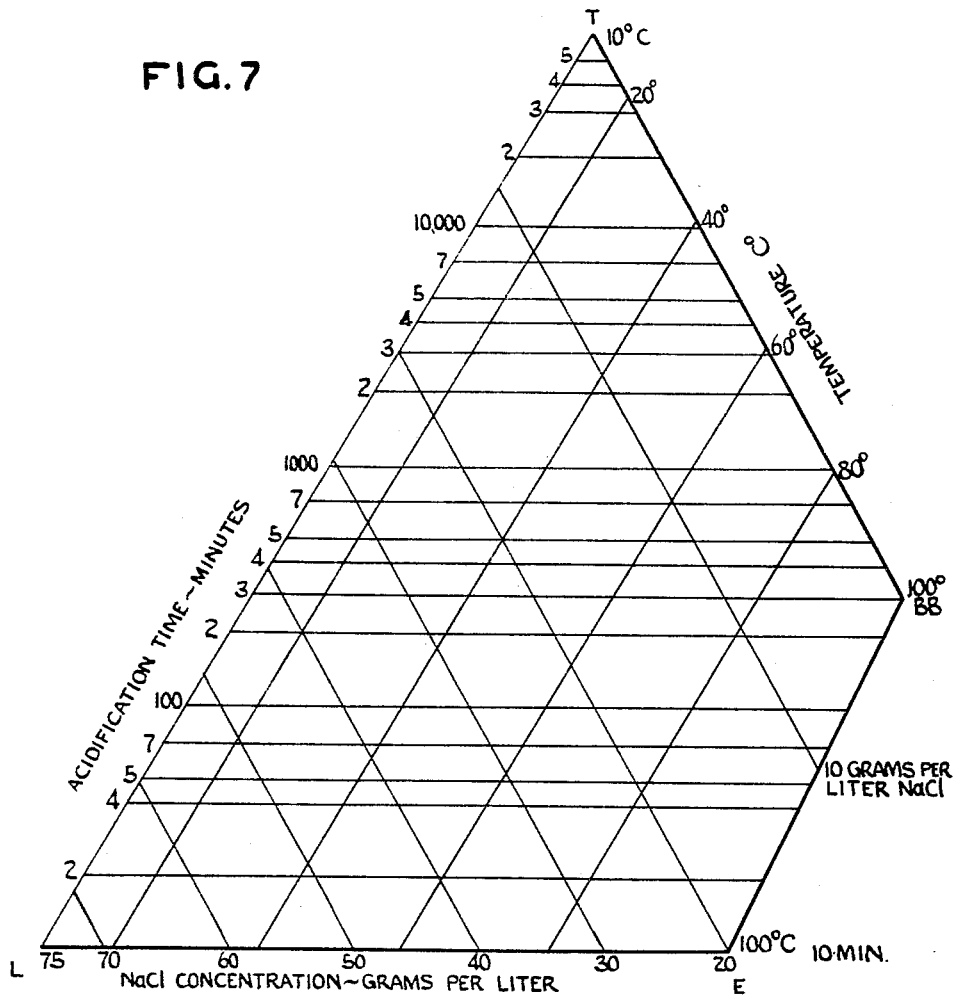
Fig. 7 illustrates the plane LEBBTL shown in Fig. 1 and showing conditions under which silica having a surface area of 25 square meters per gram can be precipitated from a solution of sodium silicate of a concentration which corresponds to an $Na_2O$ content of 20.3 grams per liter of $Na_2O$.
Figure 8:
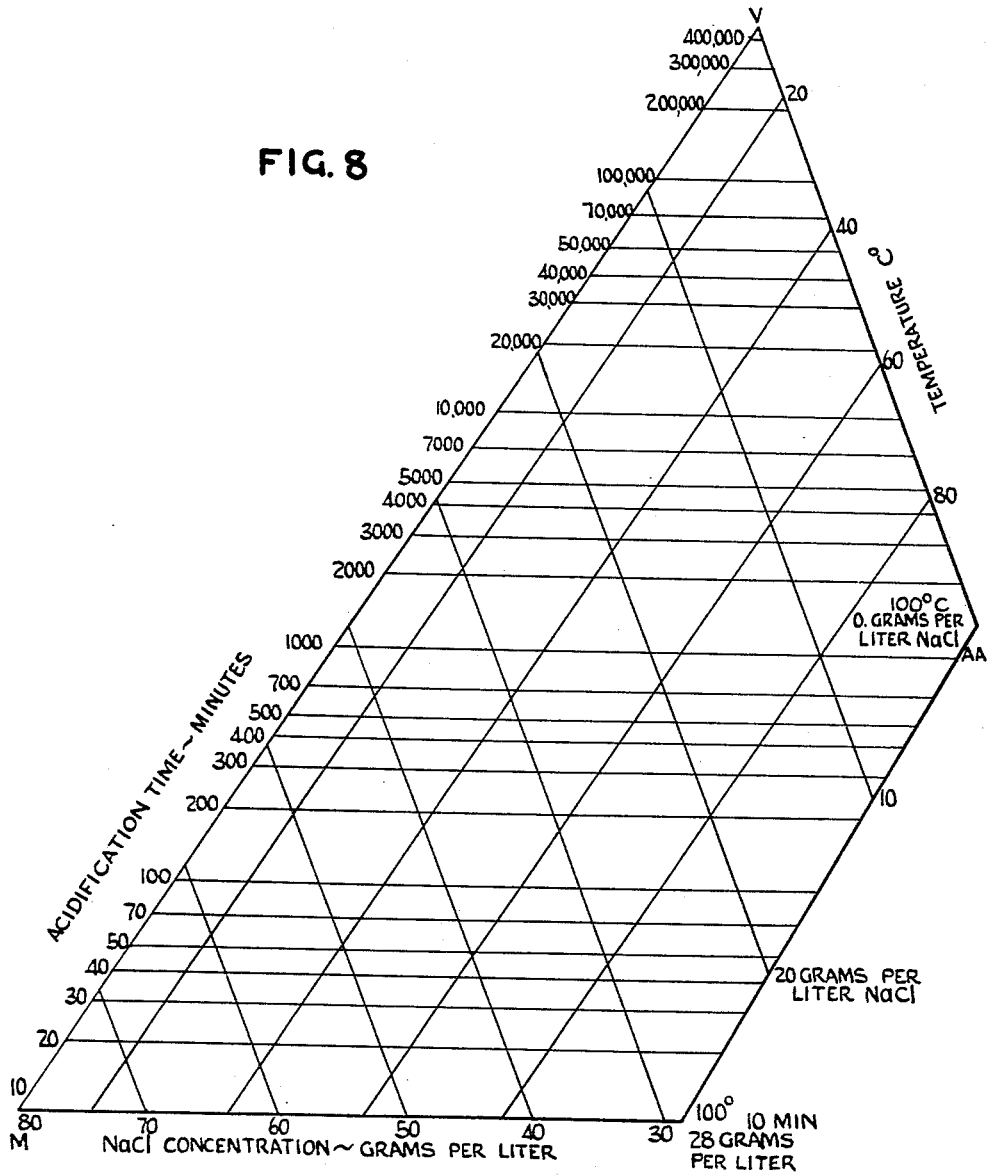
Fig. 8 illustrates the plane MFAAVM shown in Fig. 1 and showing conditions under which silica having a surface area of 25 square meters per gram can be precipitated from sodium silicate of a concentration which corresponds to an $Na_2O$ content of 8.3 grams per liter of $Na_2O$.

Changes in silica content of the solution materially affect the other conditions. This is shown by the fact that reduction in the silicate concentration from that corresponding to 30.45 grams per liter of $Na_2O$ to 20.3 or 8.3 grams per liter of $Na_2O$ shifts the conditions at which silica of 200 square meters per gram surface area is obtained from GA (at 10 minutes' acidification time) to HB at 20.3 grams per liter $Na_2O$, and JD at 8.3 grams per liter. In such a case, the limiting plane for production of silica of surface area of 200 square meters per gram at a silicate concentration of 20.3 grams per liter of $Na_2O$ is shown in Fig. 4, and this plane is bound by the lines HBEEPH shown in Fig. 1; and at a silicate concentration of 8.3 grams of $Na_2O$ per liter the plane is shown in Fig. 5 and is bound by lines JCDDRJ, also shown in Fig. 1. In like manner, the limiting plane for production of silica of surface area of 25 square meters per gram at a silicate concentration corresponding to 20.3 grams of $Na_2O$ per liter is shown in Fig. 7 and is bounded by the lines LEBBTL shown in Fig. 1. For a silicate concentration corresponding to 8.3 grams of $Na_2O$ per liter of solution, this limiting plane is shown in Fig. 8 and is defined by lines MFAAVM shown in Fig. 1.

Figure 15:
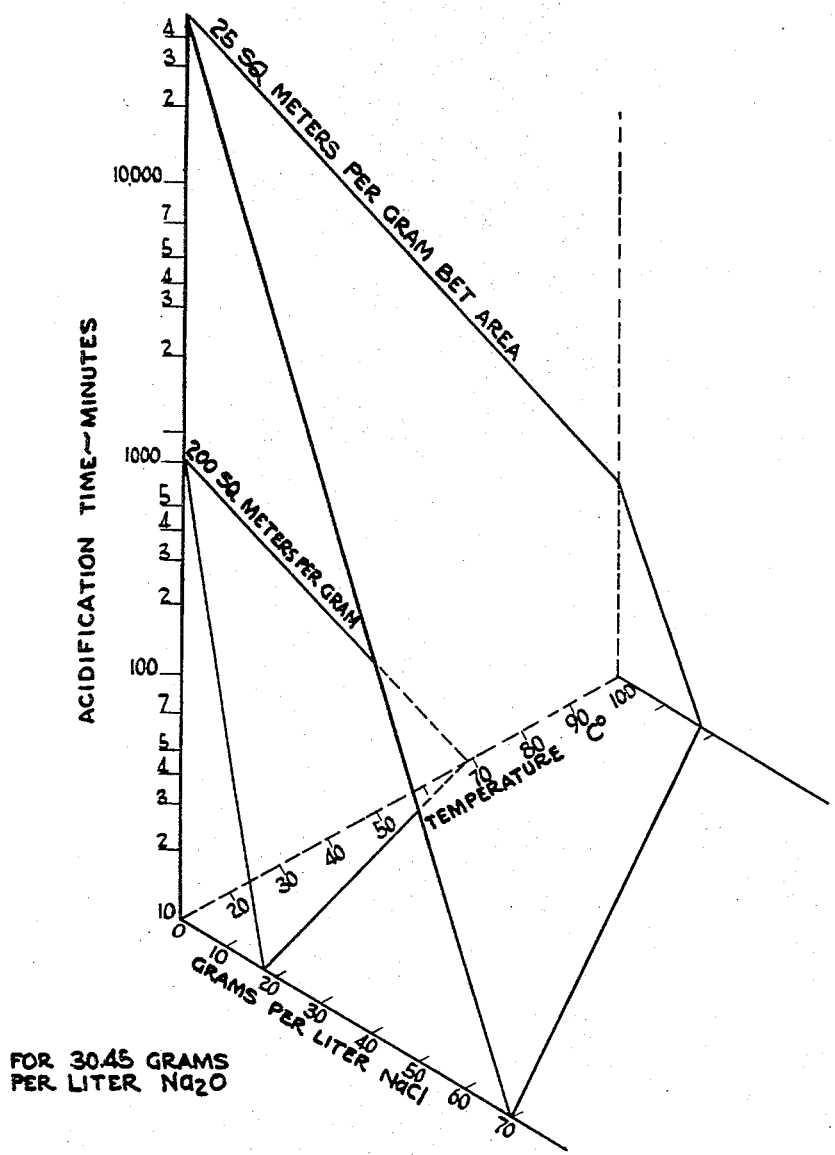
Fig. 15 is a perspective view of a three-dimensional graph illustrating the planes shown in Figs. 3 and 6, respectively, and their relationship.

From the above it becomes apparent that the volume of conditions for production of silica of surface area of 25 to 200 square meters per gram, shown in perspective in Fig. 15, for silicate concentration corresponding to 30.45 grams per liter of $Na_2O$, shifts away from the point O as the silicate concentration is decreased. The effect of this variation in silicate concentration is shown in Fig. 17. This graph shows how the silicate concentration affects the required salt concentration at an acidification time of 10 minutes and at a temperature of 10° C. These data were obtained by reference to plane IV. Similar curves showing the effect of silicate concentration upon temperature at zero salt concentrations may be readily determined by plotting the data shown in the graphs of Fig. 16. From these curves, the locus of corresponding planes showing permissible conditions at silicate concentrations not specifically plotted may be determined. The silicate concentration may range from about 5 to 150 grams per liter of $SiO_2$. Since both high and low silicate concentrations complicate recovery problems, it is preferred to use solutions containing 10 to 100 grams per liter of $SiO_2$.

Figure 9:
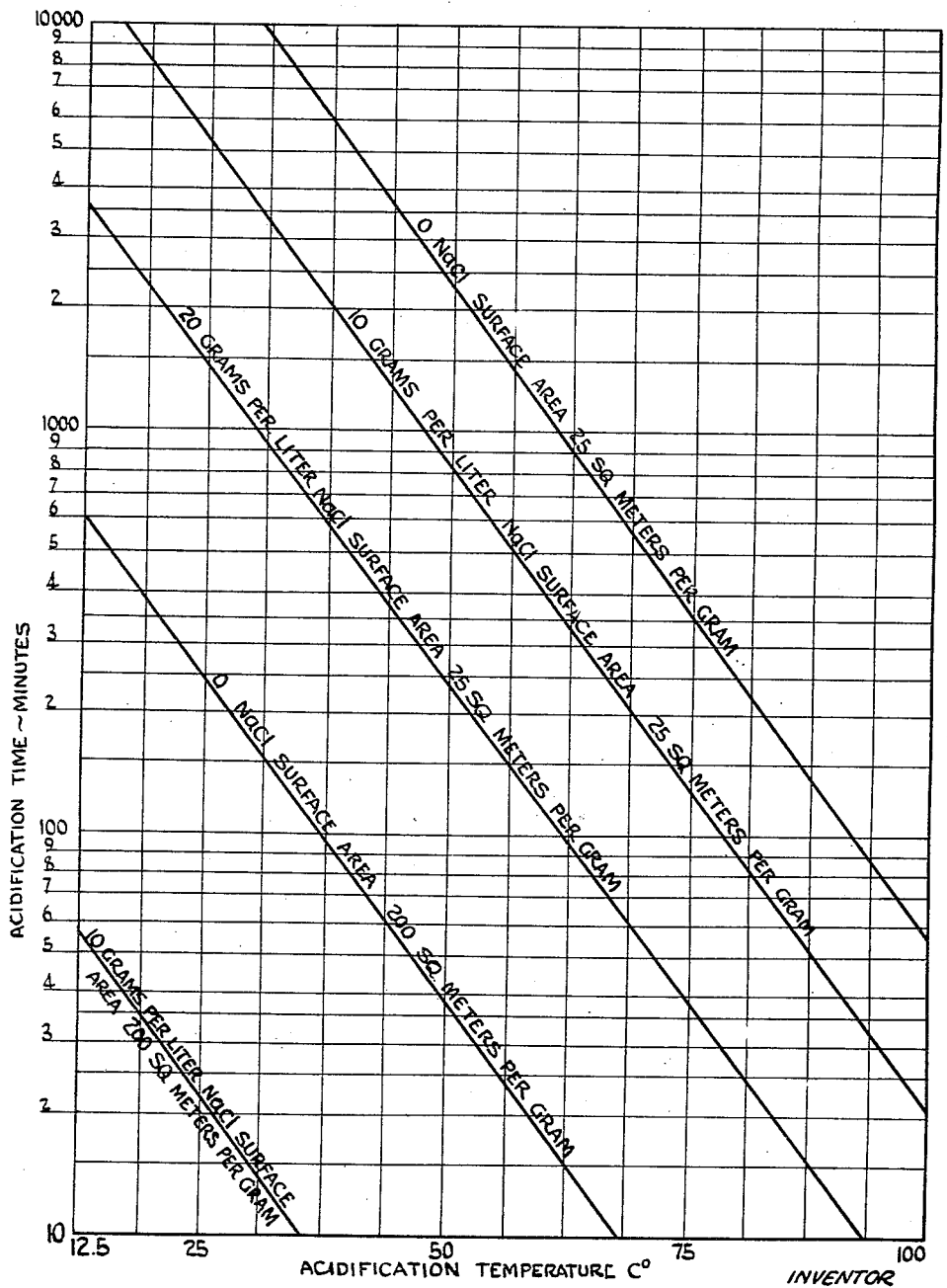
Fig. 9 is a graph showing the rates of acidification of the sodium silicate mentioned with respect to Fig. 1 necessary at various temperatures to precipitate silica having a surface area of 25 and 200 square meters per gram, respectively; when the silicate concentration of the solution corresponds to 30.45 grams per liter of $Na_2O$.
Figure 10:
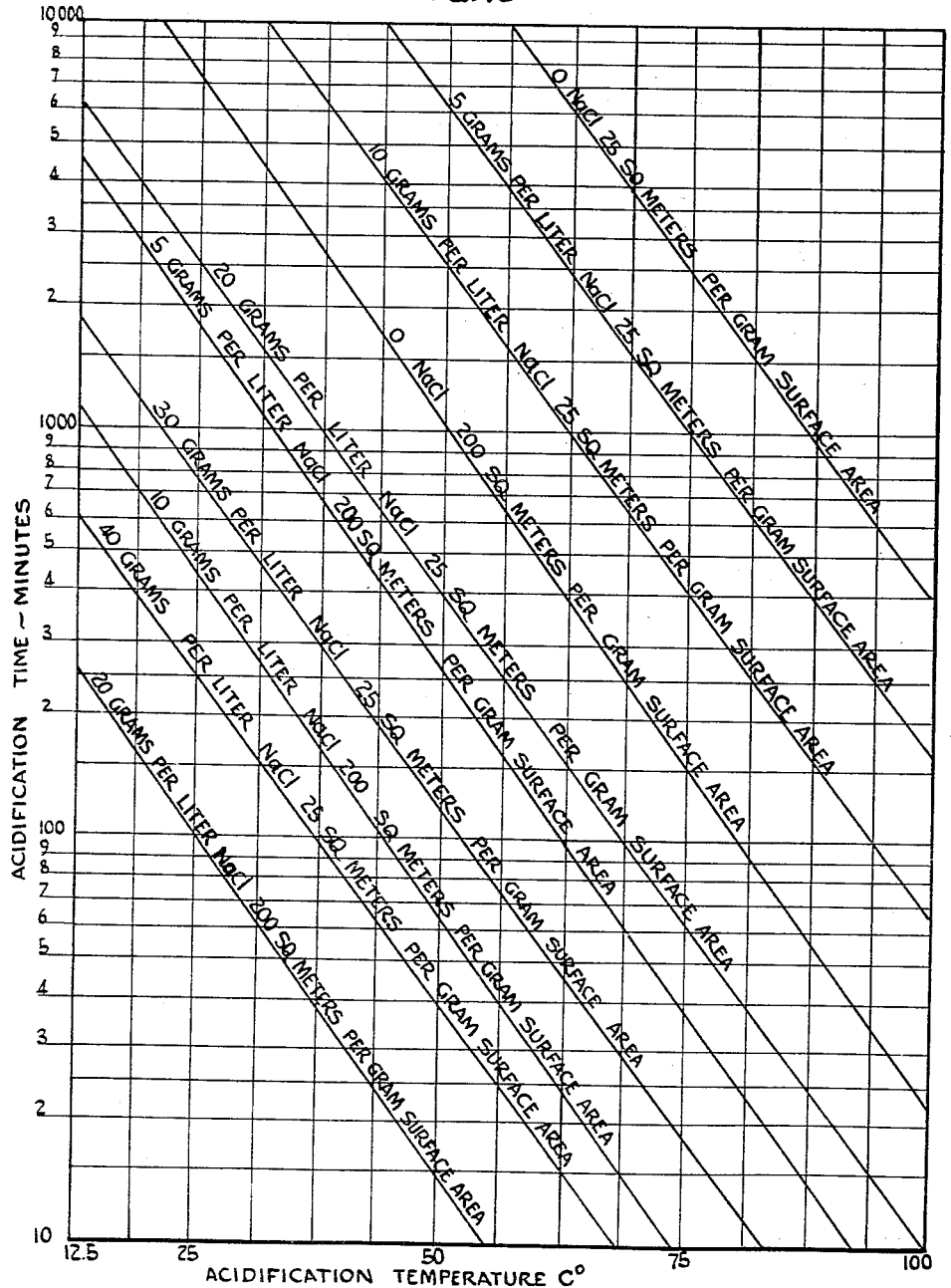
Fig. 10 is a graph showing the rates of acidification of the sodium silicate mentioned with respect to Fig. 1 necessary at various temperatures to precipitate silica having a surface area of 25 and 200 square meters per gram, respectively; the silicate concentration of the solution corresponding to 20.3 grams per liter of $Na_2O$.
Figure 11:
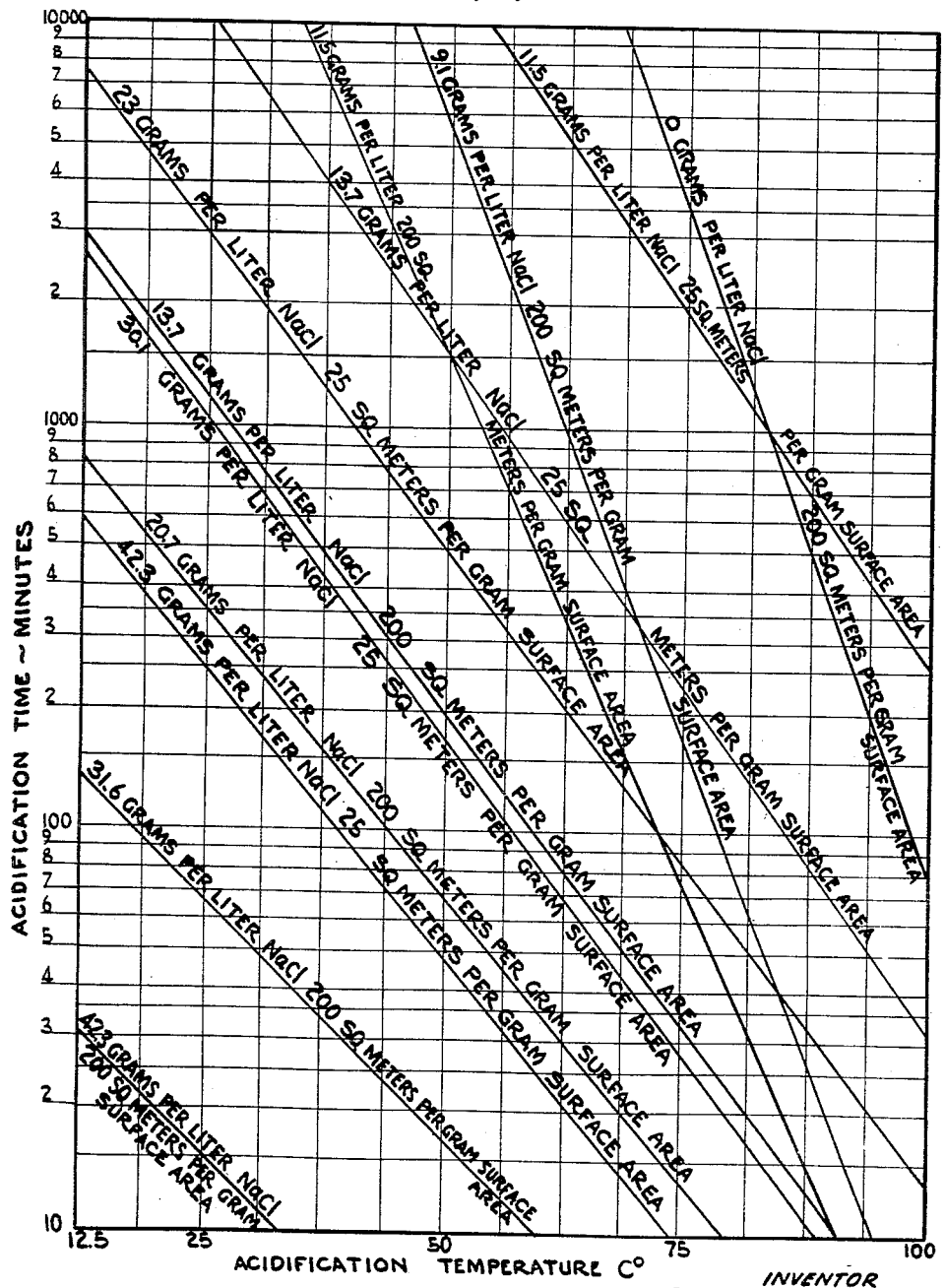
Fig. 11 is a graph showing the rates of acidification of the sodium silicate mentioned with respect to Fig. 1 necessary at various temperatures to precipitate silica having a surface area of 25 and 200 square meters per gram, respectively; the silicate concentration of the solution corresponding to 8.3 grams per liter of $Na_2O$.

The effect of temperature upon the rate of acidification at the various silicate concentrations mentioned also is shown in Figs. 9 to 11. The lines denote the acidification time at various temperatures for several concentrations of sodium chloride stated in the graphs in order to produce silica of surface area of 25 and 200 square meters per gram.

Figure 16:
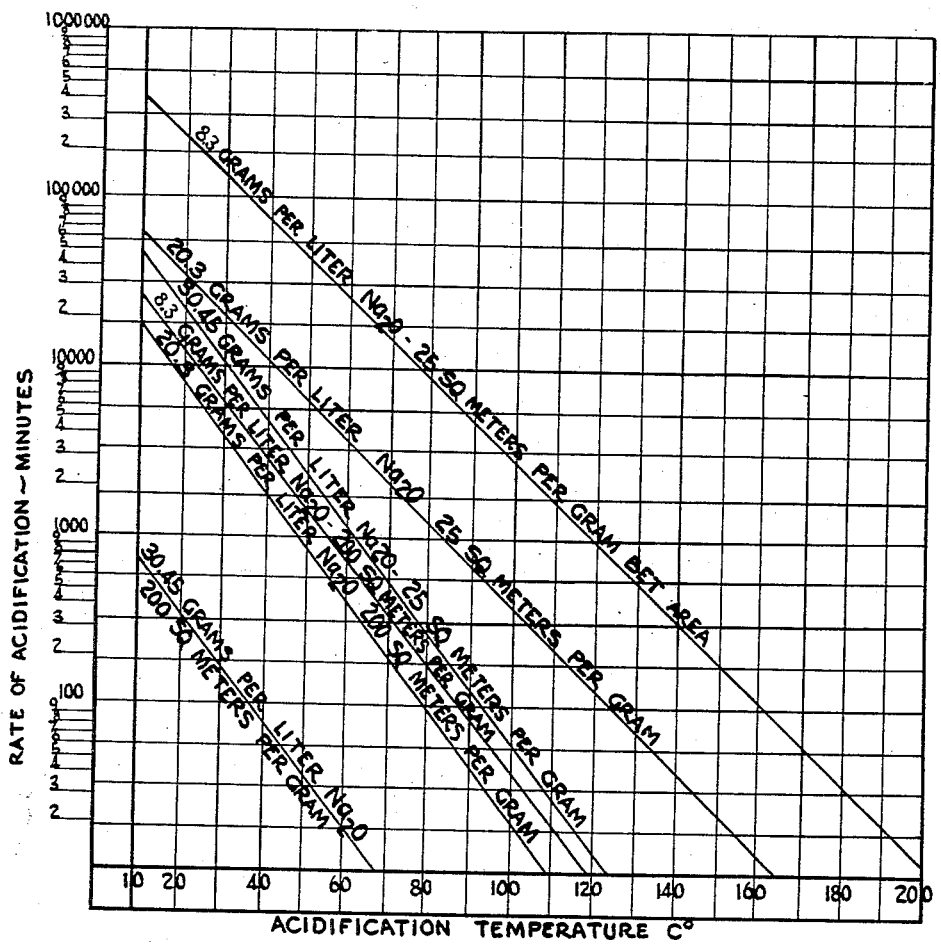
Fig. 16 shows the conditions of rate and temperature at which silica having surface areas of 25, 75, 175, and 200 square meters per gram at zero salt concentration may be precipitated.

When no salt is present, plane II, which is shown enlarged and with a wider temperature range in Fig. 16, shows that temperatures in excess of 60 to 70° C. are required where the acidification rate is about 10 minutes. The permissible temperature may be reduced when the acidification rate is increased. Where the silicate concentration ranges from 20 to 100 grams of $SiO_2$ per liter, the conditions should be kept within the limits shown by lines AN and AAV, the specific limits being dependent upon the temperature and silicate concentration used. Definite advantages accrue by avoiding the use of NaCl or like salt in the initial silicate solution since silica so precipitated may be recovered more simply. Where the initial sodium chloride concentration is above 5 grams per liter, there are larger families of conditions under which the desired silica can be obtained.

Figure 2:
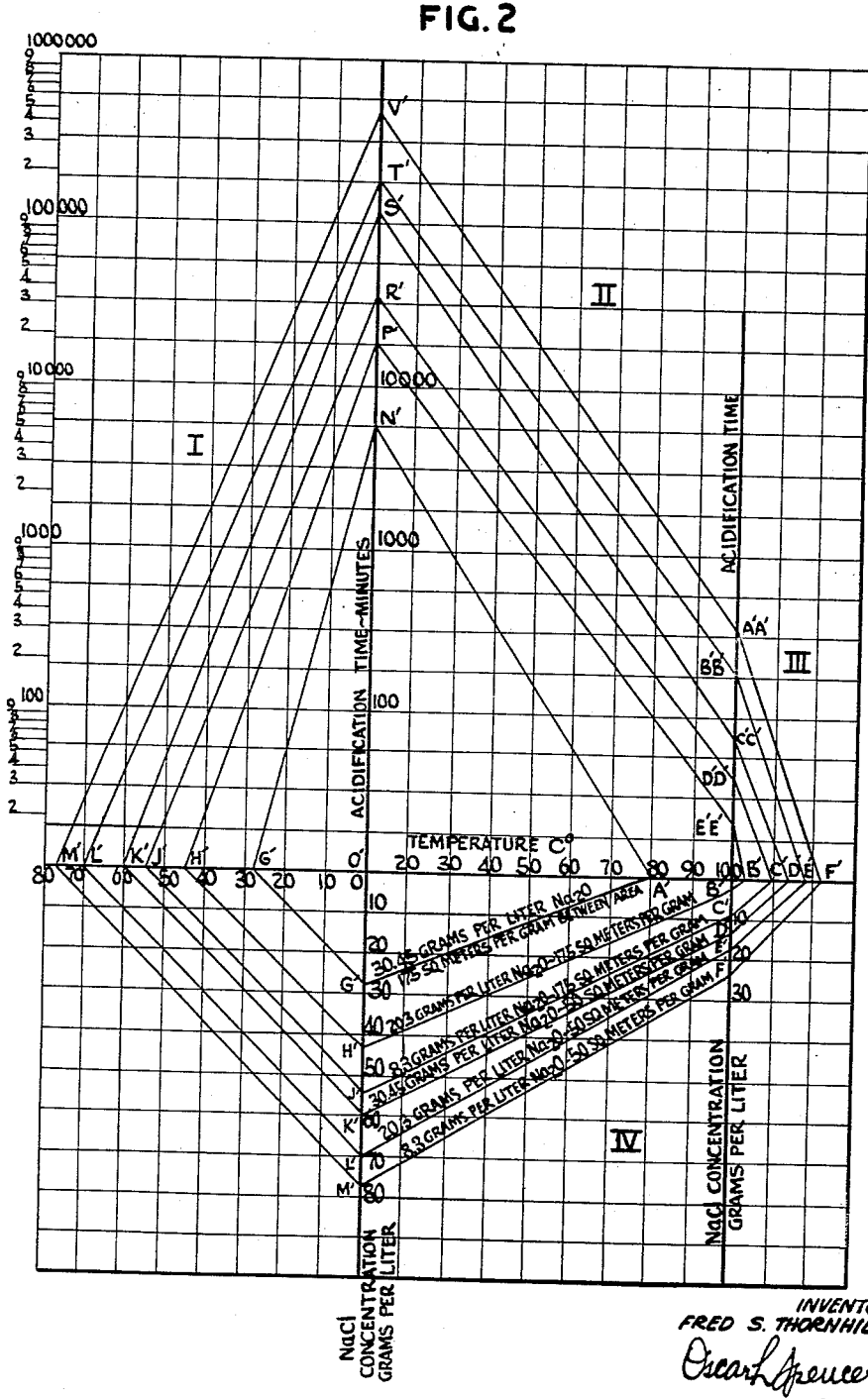

Fig. 2 is comparable to Fig. 1, showing the conditions for production of silica having a surface area of 50 to 175 square meters per gram. Silica of this surface area produces rubber having the best strength properties. The explanation supplied with respect to Fig. 1 applies in the same way to Fig. 2, the pertinent points being shown by the same letters. That is, G and G' are comparable points for the production of silica having a surface area of 200 and 175 square meters per gram, respectively. The same relationship exists between the other respective points in the graphs.

Figure 12:
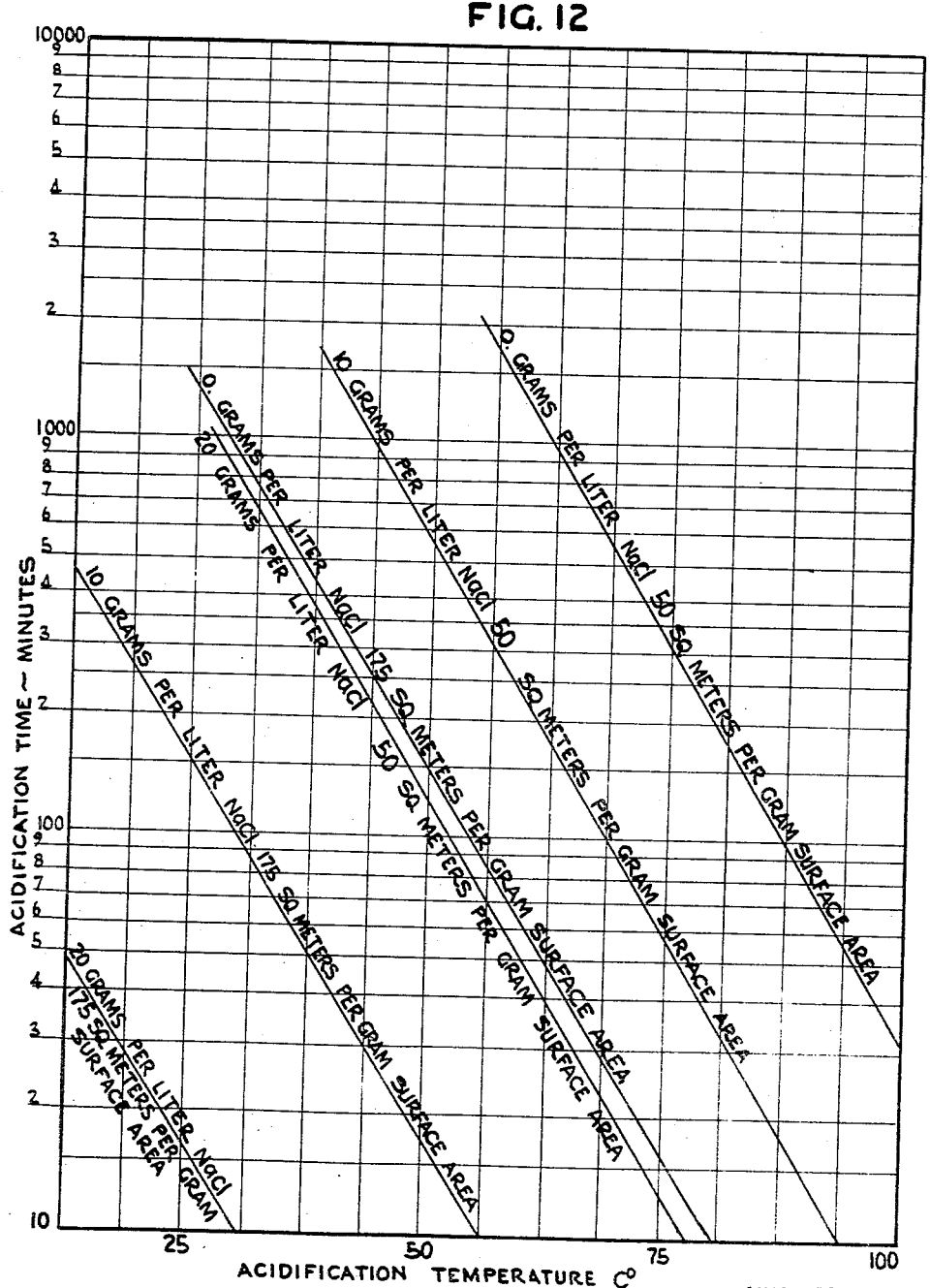
Fig. 12 is a graph showing the rates of acidification of the sodium silicate mentioned with respect to Fig. 1 necessary at various temperatures to precipitate silica having a surface area of 50 and 175 square meters per gram, respectively; the silicate concentration of the solution coresponding to 30.45 grams per liter of $Na_2O$.
Figure 13:
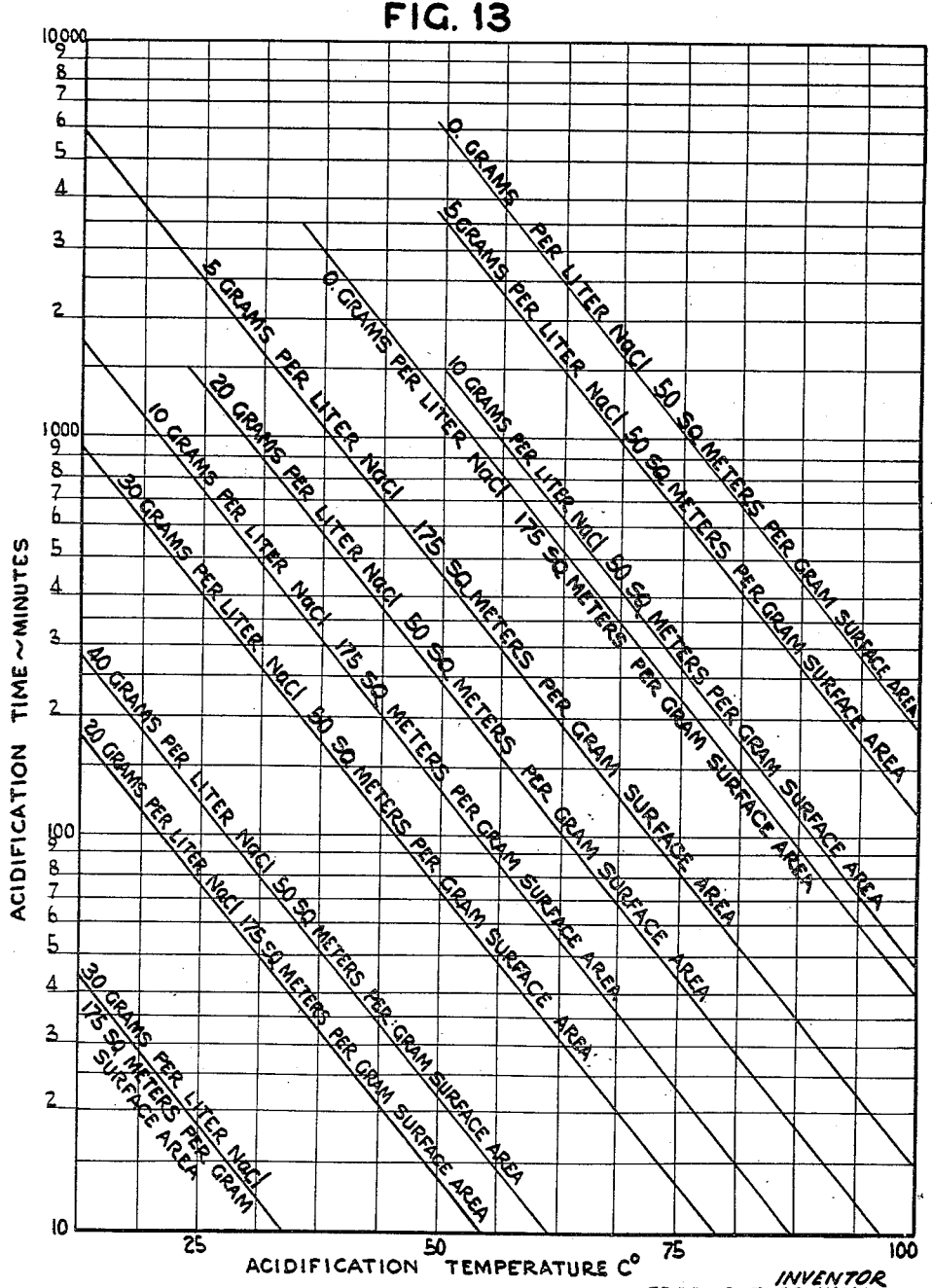
Fig. 13 is a graph showing the rates of acidification of the sodium silicate mentioned with respect to Fig. 1 necessary at various temperatures to precipitate silica having a surface area of 50 and 175 square meters per gram, respectively; the silicate concentration of the solution corresponding to 20.3 grams per liter of $Na_2O$.
Figure 14:
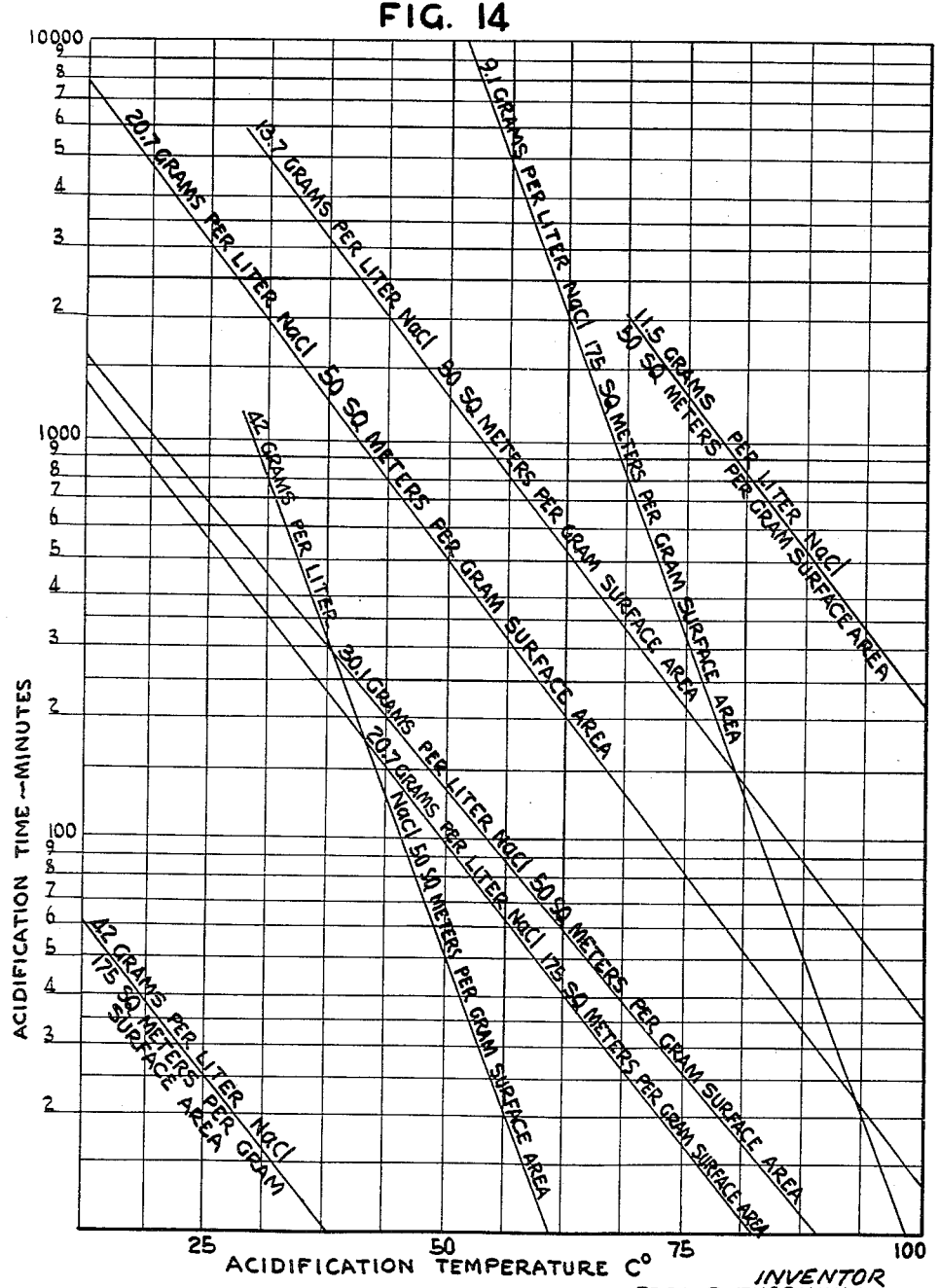
Fig. 14 is a graph showing the rates of acidification of the sodium silicate mentioned with respect to Fig. 1 necessary at various temperatures to precipitate silica having a surface area of 50 and 175 square meters per gram, respectively; the silica concentration of the solution corresponding to 8.3 grams per liter of $Na_2O$.

Figs. 12 to 14 are comparable to Figs. 9 to 11, showing the comparable conditions required to produce silica having a surface area of 50 and 175 square meters per gram.

It will be understood that pertinent graphs comparable to those shown in plane I of Fig. 1 for 10° C. salt concentration may be computed by reference to Fig. 1 or Fig. 2, depending upon the surface area of silica under consideration. Consider, for example, the conditions at 30° C. When the silicate concentration corresponds to 30.45 grams per liter of $Na_2O$, the acidification rate for production of silica of 200 square meters per gram surface area at 0 NaCl is 180 minutes, shown as point X in plane I. From plane IV we see that at 30° C. and 10 minutes acidification time, the NaCl content must be 12 grams per liter, shown at point Y in plane I. Hence, the line GN for 10° C., at 30° C. becomes the line between points X and Y on plane I. Corresponding graphs at various salt concentrations or temperatures may be determined in a similar way.

In practicing the above process, the precipitation of the silica is completed when substantially one-half of the $Na_2O$ in the sodium silicate, $Na_2O \cdot (SiO_2)_{3.33}$ is neutralized. Acidification rate is important during the first half of the reaction. Consequently, the conditions set forth in the above graphs need be observed only during the first half of the reaction.

Summarizing, where the sodium silicate concentration ranges from 20 to 100 grams of $SiO_2$ per liter, the temperature exceeds 10° C., and the alkali metal chloride ranges from 0 to 80 grams per liter, a pigment of surface area 25 to 200 square meters per gram can be obtained by controlling the conditions between the plane GANG shown in Fig. 1 and Fig. 3 and the plane MFAAVM shown in Fig. 1 and Fig. 8; the exact conditions required depending upon the $SiO_2$ concentration as shown in Fig. 1. Similarly, to obtain silica of surface area 50 to 175 square meters per gram, the conditions are controlled between the planes G'A'N'G' and M'F'A'A'V'M'.

The above graphs are based upon experiments in which carbon dioxide was introduced into a sodium silicate solution at a controlled rate and under controlled temperature, silica, and NaCl concentrations until 120 to 140 percent of the theoretical amount of carbon dioxide was introduced. Thereafter, the silica was boiled for about one hour and the silica recovered and dried at about 105° C. The surface area represents the area of the silica thus dried at a pH of about 7–8.

The various graphs mentioned above illustrate conditions of operation over a temperature range of 10 to 100° C. However, the invention is not so limited. Thus, higher temperatures may be used, particularly where superatmospheric pressure is applied to the reaction mixture. The permissible conditions of operation may be determined simply by extending the various lines beyond the axes AABBCCDDEEB and BCDEF according to conventional extrapolation methods. Hence, the various planes mentioned above are not bounded by the conditions shown by the 100° ordinate but extend beyond to higher temperatures.

These data are not limited to use in connection with carbon dioxide but apply for various acids. Typical of these are: hydrochloric acid, nitric acid, sulphuric acid, phosphoric acid, sulphurous acid, sulphur dioxide, chlorine, hypochlorous acid, hydrogen sulphide, and the like. Moreover, salts which have an acid reaction in aqueous medium, the cations of which form water soluble compounds, also may be used. Typical of these include sodium bicarbonate, sodium acid sulphate, ammonium chloride, and the like.

Many of these acids commonly are used in aqueous solution. In such a case, some allowance must be made for the additional water which dilutes the silicate. However, since the rate of acidification is important only during the first one-third to one-half of the reaction, water added with the acid in the later stages is not important. Hence, adjustment is required for only about one-third to one-half of the water added with the acidifying agent. The same generally is true of salts which are added with the acid.

The above graphs refer to precipitation of silica from aqueous sodium silicate and to the use of an initial sodium chloride content in order to aid precipitation. Equivalent amounts of other alkali metal silicates, e.g. potassium silicate, may be used in lieu of sodium silicates. Moreover, other nonreactive alkali metal salts, particularly salts of strong acids such as sodium nitrate, sodium sulphate, potassium chloride, etc. of equivalent activity may be used in lieu of sodium chloride by using an amount larger or smaller than sodium chloride, roughly in the same proportion as the mobility of the anion of the salt is greater or less than that of the chloride ion.

It will also be understood that silicate solutions having different $Na_2O$ to $SiO_2$ ratios can be used so long as the rate of neutralization of the $Na_2O$ in the silicate is that specified above. That is, the rate of neutralization of the $Na_2O$ is the important factor. Thus, solutions containing the same $Na_2O$ concentrations should be neutralized at about the same rate regardless of the $SiO_2$ content of the silicate.

Even in production of silica according to these principles, however, it has been observed that when the process is performed on a large scale, for example, in treatment of batches of silicate solution greater than 1000 gallons in volume, silica which is nonuniform in particle size is produced and wide variation can take place from batch to batch or even in a single batch.

I have discovered that this nonuniformity and irregularity in the silica produced, encountered when batches greater than 1000 gallons of sodium silicate are treated, may be avoided or effectively minimized in importance by adding the acid to a pool of the alkali metal silicate at a rate such that the first half of the stoichiometric amount of acid required to react with the sodium silicate or like alkali metal silicate (or the amount required to substantially completely precipitate the $SiO_2$ in the silicate solution) is added over a period of at least 90 minutes, i.e., the acid is added at a rate such as to neutralize all of the acid in at least 3 hours and such rate is continued until the silica is precipitated substantially completely. Thus, I have found that at short periods of acid addition, for product in large batches due to variation in the rate of acid addition tend to produce marked variation in the product in large batches due to variation in the rate of neutralization of different portions of the solution. As the time is lengthened, such variations in rate of acid addition become less important. Hence, it is preferred to add acid at a rate to neutralize such sodium silicate over a period of 3 or 4 hours or more.

From the above, it will be apparent that, in order to produce silica having desired properties on a large scale, addition of silica over a long period of time is advantageous. Quite obviously, any method by which this period of time may be shortened is advantageous.

According to a further embodiment of the present invention, I have discovered that the time for producing such silica may be reduced by adding the first half of the stoichiometric amount of acid or the amount of acid necessary to substantially completely precipitate the $SiO_2$ in the silicate (usually about 40 to 50 percent of the stoichiometric amount) over a substantial period of time in excess of 30 minutes, preferably in excess of 90 minutes, and adding the balance of the acid at a faster rate.

The degree of increase of rate at which the balance of the acid is added, after such first half has been added or after silica has been largely precipitated, is largely a matter of convenience. If desired or if possible, such balance may be added instantaneously. However, this may be difficult. Normally, such balance should be added at a rate of at least twice the rate at which the first half was introduced. Usually, not more than one hour is required for such balance of acid addition even where 3 to 4 hours or more is used to add the first half.

As explained above, the silica is prepared as herein contemplated by correlating the rate of addition of acid with the alkali metal chloride content, the temperature, and the alkali metal silicate concentration which is usually expressed as grams of $Na_2O$ per liter, referring to the $Na_2O$ of the sodium silicate $Na_2O \cdot (SiO_2)_x$.

If an alkali metal salt is to be used, best results have been obtained using sodium chloride. However, other essentially water soluble alkali metal salts of strong mineral acids (as strong as or stronger than sulphuric acid or sulphurous acid) such as sodium sulphate, sodium bromide, sodium nitrate or trisodium phosphate, or the corresponding potassium or lithium compounds may be used.

In most cases the total amount of acid or acidic material added should be sufficient to precipitate substantially all or at least the major portion of the silica in the solution and preferably should be enough to largely neutralize the $Na_2O$ content of the silicate to produce precipitated silica containing less than about 2 percent (preferably less than 1 percent) $Na_2O$. Such addition normally reduces the pH of the slurry below about 9.5. However, the amount of acid added should not be so large as to produce a silica slurry having a pH below about 5 since, in such an event, the surface area of the silica rises to an undesirable degree.

With the weaker acids or acid anhydrides, such as carbon dioxide, the pH of the slurry does not become unduly low because the pH of the aqueous acid solution and the resulting sodium salt is high. With stronger acids, such as sulphuric or hydrochloric acid, care should be taken to stop acidification before the slurry pH falls below about 5 or 6 in order to avoid increase in surface area.

According to this invention, the surface area of the silica produced as described herein may be stabilized within the desired range from a higher value by heating the silica at a pH above 5, preferably 7 to 9, in aqueous medium for a suitable period, usually in excess of 30 minutes. Even if the pH of the slurry is allowed to fall below 7 but above 5, or is allowed to fall below 5 and is readjusted above 5, any tendency of the surface area to rise is overcome by the heating herein contemplated. This is particularly true where the silica has been precipitated at a temperature below about 80° C. It is also true where the silica has been precipitated above 80° C. when the time of acidification is less than 30 minutes. Preferably, this heating is effected in the mother liquor after precipitation and redispersed in pure water or an aqueous solution of sodium chloride or like alkali metal salt.

In the convenient practice of this process, this conditioning is effected by heating the silica slurry in its mother liquor or other aqueous medium to an elevated temperature above about 60° C., usually above the temperature at which it has been precipitated, for a time sufficient to effect the desired conditioning. The time required for this heat treatment depends upon the temperature at which the heat treatment is carried out and to some extent upon the temperature at which silica has been previously precipitated. To illustrate this point, for silica precipitated within the preferred range set forth above, a heat treatment temperature of 50 to 75° C. may be required for 10 to 20 hours or more, whereas when the temperature of heat treatment ranges between 70 and 80° C., the time of treatment can be somewhat shorter, say 5 hours.

The preferred heat treating temperature is 80 to 100° C. or above, and it is usually advantageous to boil the slurry since this is a simple way of maintaining it at the desired temperature. When the slurry is maintained at its boiling temperature and still assuming precipitation at or about atmospheric temperature, a heat treatment period of 30 minutes to 2 hours is usually sufficient. Following this treatment, silica can be recovered by settling or filtration.

It has been found that silica precipitated according to the processes outlined above frequently contains an undesirably large amount of alkali metal which tends to impair the utility of the silica as a rubber pigment. The concentration of sodium or other alkali metal in the silica pigment thus obtained may range as high as 2 to 3 percent. This sodium, referred to herein as "bound sodium," is carried down with the precipitate and is not easily washed out with water. Although this bound sodium will react with hydrochloric acid added to the slurry, its insolubility in water indicates that the sodium is not present as a soluble sodium silicate but that it is in some way bound to the precipitated silica.

The product thus obtained may be treated with various electrolytes containing cations which replace sodium. Thus, acids may be used or various metal compounds, as described below.

When the silica is extrated with acids, the effect is to remove metallic elements from the silica and thereby to produce a silica of higher purity. Surface area may rise to some extent but this rise is not objectionable if the silica has been stabilized by boiling.

Thus, it has been found desirable to reduce the bound sodium content of the silica pigment in order to produce a product exhibiting superior properties when incorporated in rubber. The reduction in sodium content may be effected in any of a variety of ways. For example, the precipitated silica may be recarbonated after removal of all or a substantial portion of the mother liquor therefrom. In accordance with this procedure, the silica is reslurried in an aqueos medium and further carbon dioxide introduced into the slurry in order to reduce the sodium content to the desired degree. This operation is best carried out at low temperatures which permit removal of somewhat more sodium.

Effective reduction of the bond sodium content is best achieved by treating the silica with a sufficient quantity of a strong mineral acid such as sulphuric acid, hydrochloric acid, phosphoric, sulphurous or nitric acids. Numerous other strong acids which are stronger than carbonic acid, that is, which have a dissociation constant above $1 \times 10^{-4}$ for the first hydrogen, may be used. Such strong acids effect a rapid removal of metallic ions from the silica.

Summarizing, it is advantageous to precipitate the silica using a weak acid having a dissociation constant below about $1 \times 10^{-4}$ for the first hydrogen in order to avoid the possibility of excessive pH reduction in the reaction mixture and thus to avoid the increase in surface area resulting when the pH of the reaction mixture falls below about 5. After the surface area has been stabilized, however, the further treatment is best conducted using a strong mineral acid, such as mentioned above, having a dissociation constant above $1 \times 10^{-4}$, and preferably not less than $1 \times 10^{-2}$.

Since the $SiO_2$ concentration is important to the production of suitable silica, it is advantageous to conduct the acidification using a highly concentrated or essentially anhydrous acid. Thus, when an aqueous acid is added, dilution may be sufficient to effect variation in the silica precipitated under certain conditions. When little or no water is present in the acid, this dilution does not occur. Consequently, it is advantageous to react the sodium silicate with an acid which is anhydrous, or at least contains less than 50 percent by weight of water.

It should be understood that weaker acids such as carbonic, acetic, and like acids may be used for the further treatment to reduce the metal content of the silica. However, the metallic ions are held tenaciously by the silica. Consequently, treatment is thus made more difficult.

The degree of acid treatment effected depends upon the results desired. When silica useful for reinforcement of natural rubber, GR–S rubber, butyl rubber, GR–I rubber, and the like is desired, the $Na_2O$ content must be reduced below 1.75 percent, preferably below 1 percent by weight. When silica suitable for silicone rubber or silica grease is desired, substantially all metallic impurities must be removed. In that event, more extensive acid washing of the stabilized silica is required. In such a case, some rise in surface area to as high as 250 square meters per gram may occur. This is not objectionable.

In carrying out the process, the precipitated silica can be filtered, and the filter cake washed and reslurried in water or sodium chloride solution prior to the heat treatment step described above, or the silica can be heat treated in its mother liquor and then filtered and washed. Usually, it will be desirable to filter, wash, and reslurry a number of successive times in order to achieve adequate removal of undesired salts from the silica.

Following the precipitation and heat treatment either with or without the subsequent treatment to reduce the sodium content of the silica pigment, the silica may be recovered by filtration and dried in any suitable way. Conveniently, it may be dried at a temperature of 100 to 150° C. In such a case, the resulting product usually contains water of hydration which can, if desired, be partially driven off by low temperature calcination. On the other hand, a valuable pigment can be obtained without driving off the water of hydration.

The amount of water present in the hydrated silica after this drying step usually ranges from about 5 percent to 20 percent by weight. Of this water, approximately 2 percent to 10 percent by weight is present as "free" water, i.e. water which can be driven off by heating the pigment for 24 hours at 105° C. The water remaining after such drying is termed "bound" water and normally ranges between approximately 2 percent to 10 percent by weight, usually about 6 percent.

The products obtained by the present process have surface areas in the range of 75 to 200 square meters per gram and are very finely divided and have an average ultimate particle size below 0.1 micron, usually about 0.03 micron, as measured by the electron microscope. Products of lower surface area have a particle size in the range of 0.05 to 0.4 micron. The surface area of such products has been measured by the well known Brunauer-Emmett-Teller test (referred to hereafter as the B.E.T. test).

The silica content of the products depends upon the treatment of the precipitated silica. Thus, the products normally consist predominantly of silica, the silica content being usually in excess of 85 percent by weight on an anhydrous basis. However, metals may be introduced by contacting the silica with an aqueous solution of the metal compound such as calcium chloride, magnesium chloride or sulphate, aluminum chloride or sulphate, calcium or magnesium hydroxide, magnesium carbonate, zinc chloride, lead chloride, etc., preferably prior to drying the silica. In such an event, the silica concentration may conform to that of a metallic silicate.

The pH of the pigment materially influences its filterability and certain of its other characteristics. Thus, other factors being the same, alkaline slurries filter more readily than do acid slurries. On the other hand, when used in rubber, silica having a pH of 5 to 8.5 gives best results. Thus, it is usual practice to adjust the pH to this value before drying.

The pH of the pigment as herein referred to is measured by mixing 5 grams of the pigment with 100 grams of distilled water, adding 5 drops of saturated potassium chloride solution to the resulting slurry, and measuring the pH of the slurry with a glass electrode in the usual manner.

The following examples illustrate the results which are obtained by adding acids to sodium silicate solution at controlled rates and at various silicate concentrations and sodium chloride concentrations. In most of these experiments the acid was added over the entire period at a uniform rate. However, the same results can be achieved by increasing the rate of acid addition after the silica has been precipitated, i.e. after about one-half of the stoichiometric amount of acid has been added.

EXAMPLE I

A 30-gallon, open-top barrel, provided with an agitator consisting of a vertical shaft driven by a ¼ H.P. motor and having three 3″ propellers, was charged with 48 liters of an aqueous solution of sodium silicate

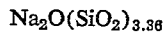

$$Na_2O(SiO_2)_{3.36}$$

containing 20.3 grams per liter of $Na_2O$, about 66 grams per liter of $SiO_2$, and 10 grams per liter of sodium chloride. Carbon dioxide gas, diluted with air to such an extent that the diluted gas had a $CO_2$ concentration of about 10 percent by volume, was introduced into the drum through a stainless steel tube with the discharge end of the tube being located below the bottom of the agitator. The rate of introduction of gas was adjusted so that just the stoichiometric amount of carbon dioxide was introduced into the solution in 24 hours. This carbonation rate was held substantially constant over the carbonation period. The temperature was maintained at 35° C. during carbonation and the mixture continuously agitated.

After the stoichiometric amount of carbon dioxide has been introduced, the mixture was heated by direct introduction of steam from a 140-pound steam line to maintain the temperature of the slurry at boiling temperature for a period of about 2 hours. The heated slurry was then filtered and the dewatered silica dried in an oven at a temperature of 108° C., after which it was micropulverized.

The surface area of the resulting finely divided silica was determined by the standard low temperature, nitrogen adsorption method proposed by Brunauer, Emmett, and Teller, and was found to be 149 square meters per gram.

The silica pigment as thus produced was incorporated by conventional compounding methods in the following GR–S rubber recipe:

| | Parts by weight |
|---|---|
| GR–S | 100.0 |
| Zinc oxide | 5.0 |
| Sulfur | 3.0 |
| Agerite powder (phenyl betanaphthylamine) | 1.0 |
| Altax (dibenzothiazyl disulfide) | 1.2 |
| Methyl Tuads (tetramethyl thiuram disulfide) | 0.15 |
| Picco 100 (coumarone-indene resin) | 15.0 |
| Diethylene glycol | 10.0 |
| Silica pigment | 58.5 |

The resulting rubber composition was subjected to various curing times at 280° F. and then tested for tensile strength and tear strength. It was found that the tensile strength of the vulcanized rubber after curing for 20 minutes at 280° F. was 2440 pounds per square inch and the tear strength was 250 pounds per inch thickness.

In the precipitation of the pigment under the above conditions, the presence of the soluble salt is important. Silica formed under the same conditions but with smaller amounts of sodium chloride was inferior as a rubber pigment, and when the sodium chloride was omitted, the precipitated silica gelled and was discarded.

EXAMPLE II

The procedure of Example I was followed except that the filtered silica pigment was washed with hydrochloric acid before drying and then washed free of chloride ions with water. The acid treated pigment was dried and micropulverized as in Example I.

The silica pigment as thus prepared was incorporated in rubber and tested as in Example I; the resulting rubber composition exhibiting a tensile strength of 2820 p.s.i. and a tear strength of 310 pounds per inch thickness.

This pigment prepared by this procedure has an exceptionally low density and hence is useful for other purposes than as a rubber pigment.

EXAMPLE III

A 90-liter autoclave kettle provided with a heating and cooling coil, an agitator, and a metal thermometer, was charged with 48 liters of a solution containing 20 grams per liter of sodium chloride and a quantity of sodium silicate sufficient to cause the solution to contain 20.3 grams per liter of $Na_2O$ and about 68 grams per liter of $SiO_2$. Essentially pure carbon dioxide was introduced through the bottom of the kettle under the liquid level of the solution at a point about one inch below the center of the agitator. The temperature was maintained at 25° C. during carbonation.

The carbon dioxide was fed to the solution at such a rate as to deliver the theoretical amount of carbon dioxide thereto in 4 hours and carbonation was continued at this rate for an additional hour, thus providing a 25 percent excess of $CO_2$ over that theoretically required to produce the carbonate.

After 5 hours of carbonation, a sample of the slurry (designated sample A in the table below) was taken out, the pigment filtered, washed twice with water, reslurried, and the pH of the slurry adjusted to 7.3 with hydrochloric acid. Thereafter, the pigment was washed until the filtrate was substantially chloride-free.

The slurry remaining in the kettle was boiled for one hour and two samples of the boiled slurry removed from the kettle. One of these samples (designated sample B in the table below) was washed with water alone while the other (sample C) was reslurried and the pH of the slurry adjusted to 7.2 with hydrochloric acid. The acidified pigment was then washed substantially chloride-free with water.

The slurry remaining in the kettle was maintained under a carbon dioxide atmosphere with agitation for an additional 2 hours. The carbon dioxide pressure was maintained from about 2 to 5 pounds per square inch gauge. This treatment of the slurry with carbon dioxide under pressure reduced the pH of the slurry somewhat. A sample of the thus treated slurry (sample D) was recovered by filtration and washed with tap water.

The above example is performed more rapidly with the same substantial result by discontinuing addition of carbon dioxide after 12 hours of introduction at the rate described in this example and thereupon adding enough twelve normal hydrochloric acid solution to the reaction mixture over a period of 10 to 30 minutes to reduce the pH of the resulting slurry to 7.2. Thereafter, the slurry is boiled and the silica is recovered as described in Example I.

All of the samples A to D were dried at 105° C. in a forced draft, laboratory oven, micropulverized, and then compounded in rubber in accordance with the procedure of Example I, after which the tensile and tear strength of the samples were determined. Table I below lists the surface areas of the different samples before incorporation in the rubber, and the tensile and tear strengths of the rubber compositions in which the respective samples were incorporated.

*Table 1*

| Sample No. | Surface Area, Sq. meters per gr. | Tensile Strength, lbs./sq. in. | Tear Strength, lbs. per in. |
| --- | --- | --- | --- |
| A | 337 | 3,110 | 280 |
| B | 122 | 3,120 | 330 |
| C | 138 | 3,220 | 400 |
| D | 127 | 3,550 | 320 |

The curing rate of rubber containing sample A was substantially slower than rubber containing samples B, C, and D, respectively.

EXAMPLE IV

A 4000-gallon rubber lined tank equipped with a motor-driven turboagitator was charged with a 2700-gallon batch of silicate-salt solution prepared by adding hot concentrated sodium silicate to brine in the ratio of 1:4 by volume. The sodium silicate solution contained 20.3 grams per liter of $Na_2O$ and the salt solution 17.4 grams per liter of NaCl. The solution after mixing was brought to a temperature of 30° C. by heating with live steam and was then carbonated by bubbling therethrough a gaseous mixture containing 40 percent $CO_2$ and the remainder essentially nitrogen to precipitate silica. The gas was introduced through a 2-inch pipe into the bottom of the tank and entered the solution at a point just under the agitator propeller. The carbonation rate was such as to introduce the theoretical amount of $CO_2$ in 3.5 hours. Agitation of the solution was continued during carbonation.

At the end of 4.5 hours of carbonation, the batch was heated to boiling by injection of live steam. The heating rate was such as to increase the temperature of the solution about 1° C. per minute and, when the boiling point had been reached, the solution was boiled for one hour. During heating and boiling, the gas was added at a reduced rate.

After standing overnight, the resulting slurry was pumped to a 3-foot by 3-foot wash wheel where the slurry was filtered and the cake washed to remove salt and alkali. The slurry fed to the wash wheel was kept hot by steam-heated coils and hot condensate was used as wash water. The washed filter cake was reslurried, then again filtered, then reslurried and returned to the precipitation tank where the alkali therein was neutralized with 10 N HCl to reduce the $Na_2O$ content to 0.5 gram per liter. The salt content of the neutralized slurry was 4.0 grams NaCl per liter and the pH was 7.2. The slurry contained 0.43 pound per gallon of solids.

The slurry was then pumped to a 2-foot by 4-foot diameter vacuum filter wheel and filtered. The filter cake from this wheel was charged to a 3-foot by 25-foot steam-heated rotary drier and dried to a moisture content of 4 per cent to 6 percent, after which the dried material was pulverized in a No. 1 micropulverizer. The silica pigment as thus prepared had the following properties:

| | |
| --- | --- |
| B.E.T area in sq. meters/gram | 129 |
| Electron microscope dia., A | 260–340 |
| Bulk density, lbs./cu. ft. | 9.7 |
| Screen residue: | |
| 100 mesh % | 0.3 |
| 150 mesh % | 1.8 |
| 200 mesh % | 7.8 |
| 300 mesh % | 12.6 |
| Moisture, 105° C., percent | 6.86 |
| Ignition loss, percent | 11.31 |
| Chloride as NaCl | 2.16 |
| $R_2O_3$ oxides | 0.75 |
| pH | 8.6 |
| Titrated alkalinity as Na, percent | 0.64 |
| CaO, percent | 0.21 |
| Total Na (including that in NaCl) | 1.61 |

This pigment was incorporated in a GR–S rubber formula as follows:

| | Parts by weight |
| --- | --- |
| GR–S | 100.0 |
| Zinc oxide | 5.0 |
| Sulfur | 3.0 |
| Agerite powder (phenyl betanaphthylamine) | 1.0 |
| Altax (dibenzothiazyl disulfide) | 1.2 |
| Methyl Tuads (tetramethyl thiuram disulfide) | 0.15 |
| Picco 100 (coumarone-indene resin) | 15.0 |
| Glycol | 3.5 |
| Silica pigment | 58.5 |

A rubber sample as thus compounded was cured for 20 minutes at 280° F. and gave a tensile strength of 3280 pounds per square inch and a tear strength of 25 pounds per inch thickness.

The time of performing this experiment may be shortened by adding the last half of the acid over a period of a few minutes. $H_2SO_4$ or HCl solution may be used for such last half in lieu of $CO_2$.

EXAMPLE V

A 90-liter autoclave kettle provided with a heating and cooling coil, an agitator, and a metal thermometer, was charged with 12,850 grams of sodium silicate solution containing 976 grams of $Na_2O$ and 3115 grams of $SiO_2$. The solution was diluted to 48 liters total volume and the temperature raised to 95° C. The solution was carbonated with 100 percent $CO_2$ and a carbonation rate was used such as to introduce the theoretical amount of $CO_2$ in about 30 minutes. Carbonation was continued at this rate for about one hour at the end of which time the pH of the slurry was 9.85.

The resulting slurry was filtered and washed twice with hot tap water. The filter cake was reslurried and adjusted to a pH of 6.75 by adding 400 cc. of 3.5 N HCl thereto. The acidified slurry was then filtered and the filter cake washed nearly chloride-free with hot tap water, after which the precipitate was dried at 105° C. in a forced draft laboratory oven, then micropulverized, conditioned at 50 percent humidity and 73.5° F. overnight, analyzed and compounded in rubber as previously described. The finished pigment had a pH of 8.2 and contained 0.61 percent sodium. Its B.E.T. surface area was 148 square meters per gram. A vulcanized rubber sample incorporating the pigment exhibited a tensile strength of 2710 pounds per square inch and a tear strength of 260 pounds per inch.

EXAMPLE VI

A series of samples were prepared using essentially the procedure of Example I but varying the concentration of sodium chloride in the silicate solution. The conditions of preparation and properties of the pigment for this series are listed in the table following:

due to the fact that the products contained substantial residual sodium and, after boiling, were treated with acid to reduce the pH thereof. The large amount of sodium caused development of high surface area. This emphasizes the importance of substantially complete neutralization of the $Na_2O$.

EXAMPLE VII

Three other series of samples were prepared using essentially the procedure of Example III above, but modified in various respects. The procedural modifications in each case and certain properties of the pigment produced are indicated in Tables III, IV, and V, below. The data of the three tables differ in that the results set forth in Table III were obtained by using 100 percent $CO_2$; those in Table IV with 40 percent $CO_2$; and those in Table V with 10 percent $CO_2$. In the case of the 10 per-

*Table II*

| NaCl in Grams per liter of Solution | Silicate in terms of grams $Na_2O$ per liter of Solution | Temperature of Solution during Carbonation | Time of $CO_2$ Introduction, Minutes | pH | Na Content of Silica, percent by weight | Surface Area, B.E.T., square meters per gram |
|---|---|---|---|---|---|---|
| 0 | 20.3 | 35 | 1,440 | Gel—Precipitated product discarded | | |
| 20 | 20.3 | 35 | 1,440 | 10.8 | 2.03 | 56 |
| 20 | 20.3 | 35 | 1,440 | 7.0 | 0.25 | 298 |
| 40 | 20.3 | 35 | 1,440 | 9.7 | 1.37 | -------- |
| 10 | 20.3 | 35 | 1,440 | 5.2 | ------ | 518 |
| 8 | 20.3 | 35 | 1,440 | 5.3 | ------ | 420 |
| 11.5 | 20.3 | 35 | 1,440 | 5.7 | ------ | 422 |

It will be noted that certain of these products had a surface area which was unexpectedly high. This was cent and 40 percent $CO_2$, the balance of the gas in the mixture was essentially nitrogen.

*Table III*

[100% $CO_2$ Gas]

| Experiment Series | NaCl in Gms. per Liter | Temp. °C. | Carbonation* Rate, Min. | Carbonation* Degree, percent | Carbonation* Time, Min. | Carbonation* Degree, percent | Heating | Slurry, pH | Amount of Na in Product, percent by weight | Pigment, pH | Surface, B.E.T., Square Meters per Gram | Tensile, lbs. per square inch | Tear, lbs. per inch thickness |
|---|---|---|---|---|---|---|---|---|---|---|---|---|---|
| A | 30 | 25 | 60 | 126 | 90 | 164 / 129 | Boiled (a) | | | | | | |
| 1 | Washed with hot $H_2O$, reslurried and boiled, retreated with $CO_2$ to pH. | | | | | | | 7.9 | 0.93 | 9.0 | 129 | 3,080 | 270 |
| 2 | Washed with cold $H_2O$, reslurried cold and retreated with $CO_2$ to pH. | | | | | | | 7.29 | 0.85 | 8.3 | 139 | 2,850 | 290 |
| B | 20 | 25 | 240 | 90.5 | 300 | 181 / 131 | Boiled (b) | | | | | | |
| 1 | Boiled; washed; acidified with $CO_2$ to pH. | | | | | | | 7.95 | 1.11 | 9.7 | 124 | 3,180 | 320 |
| C | 20 | 50 | 60 | | | | | 7.2 | 0.3 | 7.7 | 280 | 2,840 | 260 |
| 1 | Boiled and cooled under $CO_2$. | | | | | | | | Gel Produced | | | | |
| D | 0 | 65 | 240 | 103 | 300 | 175 / 122 | Boiled (c) | | | | | | |
| E | 0 | 98 | 30 | | 60 | 110 | | 9.85 | | | | | |
| 1 | Washed twice with cold $H_2O$; reslurried cold; acidified to pH. | | | | | | | 6.6 | 0.75 | 8.7 | 159 | 2,890 | 240 |
| 2 | Washed twice with hot $H_2O$; reslurried hot; acidified to pH. | | | | | | | 6.75 | 0.52 | 8.2 | 148 | 2,790 | 200 |
| F | 0 | 98 | 60 | 92 | 90 | 122 | | 9.4 | | | | | |
| 1 | Water washed. | | | | | | | | 1.90 | 10.4 | 92 | 2,770 | 260 |
| 2 | Water washed, acidified with HCl to pH. | | | | | | | 7.1 | 0.90 | 9.2 | 98 | 2,860 | 290 |

*The headings under "Carbonation" are abbreviated designations of the following conditions: "Rate, Minutes" is the calculated time required to introduce the theoretical amount of carbon dioxide required to convert the sodium of the sodium silicate into sodium carbonate. "Degree, Percent" is the measured degree of carbonation determined by analysis at the end of this calculated time interval. "Time, Minutes" is the actual time of carbonation. "Degree, Percent" is the measured degree of carbonation at the end of the carbonation period.
In carrying out the experiments, the initial rate of carbon dioxide introduction was set at approximately the value required to introduce the theoretical amount of carbon dioxide in the time interval set forth in this column.
(a) After boiling, the degree of carbonation was 129%.
(b) After boiling, the degree of carbonation was 131%.
(c) After boiling, the degree of carbonation was 122%.

Table IV

[40% CO₂ Gas]

| Experiment Series | NaCl in Gms. per Liter | Temp. °C | Carbonation* | | | | Heating | Slurry, pH | Na in Pigment percent by weight | Pigment, pH | Surface, B.E.T., Square Meters per Gram | Tensile, lbs. per square inch | Tear, lbs. per inch thickness |
|---|---|---|---|---|---|---|---|---|---|---|---|---|---|
| | | | Rate, Min. | Degree, percent | Time, Min. | Degree, percent Final | | | | | | | |
| F | 30 | 25 | 60 | 88 | | | Boiled 1 hr. | 10.5 | | | | | |
| 1 | Washed twice with H₂O at 55° C. Retreated with CO₂ at 55° C. to pH 8.5. Washed with H₂O at 55° C. | | | | | | | 8.5 | 1.45 | 9.7 | 261 | 2,850 | 300 |
| 2 | Washed twice with H₂O at 55° C. Retreated with CO₂ at 55° C. to pH 7.9. Washed with H₂O at 55° C. | | | | | | | 7.9 | 1.51 | 9.5 | 232 | 2,710 | 240 |
| G | 20 | 25 | 180 | | | | Boiled 0.5 hr. | 10.0 | | | | | |
| 1 | Washed twice with H₂O at 55° C. Retreated with CO₂ to pH 8.5. | | | | | | | 8.5 | 1.32 | 9.7 | 163 | 2,890 | 260 |
| 2 | Boiled 1 hr. to pH 10.1. Washed twice with H₂O at 55° C. Treated with CO₂ at 55° C. to pH 8.5. | | | | | | | 8.5 | 1.34 | 9.7 | 156 | 3,130 | 280 |
| H | 20 | 25 | 180 | 100 | | 110 | Boiled 1 hr. | 9.8 | | | | | |
| 1 | Washed twice. Carbonated to pH. Cooled and carbonated after boiling to pH 9.6. | | | | | | | 9.6 | 1.93 | 10.4 | 131 | 2,740 | 240 |
| 2 | Washed twice. Retreated to pH 8.5 with 100% CO₂. | | | | | | | 8.5 | 1.30 | 9.8 | 136 | 3,210 | 390 |
| I | 20 | 25 | 180 | | 360 | 137 / 128 | Boiled 1 hr. | | | | | | |
| 1 | Filtered and washed | | | | | | | 9.5 | 1.90 | 10.3 | 116 | 3,050 | 290 |
| 2 | Washed twice, reslurried, washed | | | | | | | 9.5 | 1.95 | 10.3 | 113 | 3,040 | 310 |
| 3 | Washed twice, adjusted with HCl to pH | | | | | | | 8.5 | 1.27 | 9.7 | 125 | 3,220 | 320 |
| 4 | Washed twice, adjusted with 40% CO₂ to pH | | | | | | | 8.5 | 1.19 | 8.5 | 125 | 3,040 | 280 |
| 5 | Washed twice, adjusted with HCl to pH | | | | | | | 6.9 | 0.60 | 6.9 | 150 | 2,850 | 280 |
| K | 10 | 65 | 60 | 92 | | | | Products were gels | | | | | |
| | 0 | 85 | 75 | 104 | | | | Products were gels | | | | | |

*See note in connection with Table III.

Table V

[10% CO₂ Gas]

| Experiment Series | NaCl, Gms. per Liter | Temp., °C | Carbonation* | | | | Heating | Slurry, pH | Alkalinity, Percent Na | pH | Surface, B.E.T., Square Meters per Gram | Tensile, lbs. per square inch | Tear, lbs. per 0.1 in. thickness |
|---|---|---|---|---|---|---|---|---|---|---|---|---|---|
| | | | Rate, Min. | Degree, Percent | Time, Min. | Degree, Percent | | | | | | | |
| L | 20 | 25 | 180 | 68 | 240 | 105 | | | | 10.0 | 342 | | |
| 1 | Unboiled slurry carbonated 129% | | | | | | | | | | | | |
| 2 | Boiled, filtered, washed hot | | | | | | | | 2.28 | 10.2 | 133 | 2,570 | 29 |
| 3 | Boiled, filtered, washed cold | | | | | | | | 1.98 | 10.2 | 132 | 2,720 | 24 |
| M | 20 | 25 | 240 | 103 | 300 | 124 | | 7.3 | 1.42 | 9.7 | 284 | 3,060 | 30 |
| 1 | Unboiled, HCl adjusted to | | | | | | | | 1.97 | 10.3 | 128 | 3,180 | 25 |
| 2 | Boiled, washed | | | | | | | 7.3 | 0.96 | 9.4 | 135 | 3,380 | 24 |
| 3 | Boiled, washed, HCl adjusted to | | | | | | | 8.5 | 1.40 | 9.9 | 118 | 3,110 | 25 |
| 4 | Boiled, washed, CO₂ adjusted to | | | | | | Boiled | | | | | | |
| N | 10 | 25 | 1,440 | | | | Boiled | 7.0 | 0.3 | 8.8 | 154 | 2,780 | 26 |
| 1 | Filtered and cooled under CO₂ | | | | | | | | | | | | |
| O | 10 | 25 | 1,440 | | | | | | | | | | |
| 1 | Washed with CO₂ water | | | | | | | | 1.05 | 9.5 | 222 | | |
| 2 | Washed with saturated NaCl, boiled, washed | | | | | | | | 1.19 | 9.9 | 103 | 2,890 | 26 |
| 3 | Heated under CO₂ pressure, hot washed | | | | | | | | 0.58 | 8.7 | 121 | | |
| 4 | Heated under CO₂ pressure, recarbonated | | | | | | | 7.5 | 0.19 | 7.0 | 154 | 2,990 | 26 |
| 5 | Heated under CO₂ pressure, HCl added | | | | | | | | 0.01 | 3.9 | 253 | 2,790 | 26 |
| P | 10 | 55 | 120 | 71 | 180 | 120 | Boiled | | | | | | |
| 1 | Washed with hot water | | | | | | | | 3.18 | 10.2 | 158 | 1,480 | 18 |
| Q | 10 | 65 | 180 | | 240 | 120 | | | | | | | |
| 1 | Washed hot, recarbonated to pH | | | | | | | 8.0 | 1.09 | 9.5 | 113 | 2,810 | 27 |
| 2 | Washed cold, recarbonated to pH | | | | | | | 8.0 | 1.14 | 9.5 | 119 | 2,900 | 25 |
| R | 0 | 98 | 240 | 96 | | | | | | | | | |
| 1 | Water washed | | | | | | | | 2.08 | 10.7 | 60 | 1,650 | 11 |
| 2 | Water washed, HCl adjusted to pH | | | | | | | 7.1 | 0.87 | 9.7 | 51 | 2,130 | 13 |
| 3 | Water washed, CO₂ adjusted to pH | | | | | | | 8.3 | | 10.5 | 49 | | |
| S | 0 | 98 | 90 | 76 | | | | | | | | | |
| 1 | Water washed | | | | | | | | | 10.7 | 144 | | |
| 2 | HCl adjusted to pH | | | | | | | 6.8 | | 9.0 | 168 | | |
| 3 | HCl adjusted to pH | | | | | | | | | 7.7 | 374 | | |
| T | 0 | 98 | 75 | 180 | 110 | | | 10.0 | | | | | |
| 1 | Water washed | | | | | | | | 2.44 | 10.4 | | 2,790 | 21 |
| 2 | Water washed, retreated with CO₂ to pH | | | | | | | | 1.31 | 9.8 | 79 | 2,500 | 21 |
| 3 | Water washed, HCl adjusted to pH | | | | | | | 6.8 | 0.69 | 8.9 | 98 | 2,690 | 23 |
| 4 | Water washed, reheated | | | | | | | | 1.58 | 10.2 | 82 | 2,510 | 19 |

*See note in connection with Table III.

EXAMPLE VIII

A series of silica pigment samples was prepared in accordance with the present process containing varying quantities of sodium, and these samples were tested in rubber to determine the effect of sodium variation on tensile and tear strengths. The results of these tests are given in Table VI which includes results for both GR-S rubber and neoprene, and also includes the results of conventional screen tests of the pigment. These samples were prepared substantially in accordance with the procedure of Example IV with certain minor modifications as indicated on next page.

|  | Samples A—D—E | Samples B—C—F |
| --- | --- | --- |
| Na₂O—grams per liter | 20.58 | 10.8 |
| NaCl | 15.78 | 15.96 |
| Total gallons | 2,780 | 2,960 |
| Carbonation Rate—Hours | 3½ | 4 |
| Carbonation Time—Hours | .5 | .5 |
| Carbonation Degree—Percent | 114 | 102.5 |

*Table VI*

| Sample No. | Screen Test, percent [1] | Na, percent | GR-S Tensile, lbs. per square inch | Tear, lbs. per inch | Neoprene Tensile, lbs. per square inch | Tear, lbs. per inch | B.E.T., square meters per gram |
| --- | --- | --- | --- | --- | --- | --- | --- |
| A | 100- 1.2<br>150- 3.8<br>200- 9.1<br>300-16.5 | 0.56 | 3,420 | 390 | 3,020 | 530 | 157 |
| B | 100- 1.5<br>150- 4.4<br>200- 9.8<br>300-16.0 | 0.59 | 3,280 | 430 | 2,980 | 500 | 155 |
| C | 100- 2.2<br>150- 6.2<br>200-13.2<br>300-19.9 | 1.39 | 2,550 | 260 | 3,010 | 470 | 142 |
| D | 100- 0.6<br>150- 3.8<br>200-12.2<br>300-21.0 | 1.32 | 2,790 | 210 | 2,810 | 440 | 126 |
| E | 100- 1.0<br>150- 5.8<br>200-16.5<br>300-24.5 | 1.69 | 2,100 | 200 | 2,180 | 320 | 116 |
| F | 100- 1.3<br>150- 7.6<br>200-19.0<br>300-29.3 | 2.14 | 1,890 | 220 | 1,890 | 280 | 119 |

[1] The percentages in this column are the percentages by weight of material retained on screens having the stated mesh sizes.

EXAMPLE IX

Another series of tests was run to determine the effect of variation in the time the slurry is boiled on the properties of the finished pigment. The samples used in these tests were unboiled slurries prepared according to Example IV, with the modifications listed below:

| Na₂O | 20.45 grams per liter | Temperature, 30.5° C. |
| --- | --- | --- |
| NaCl | 17.85 grams per liter | Carbonation time, 5 hours. |
| Amount | 2,830 gallons | CO₂, 38 percent. |

The results of these tests are given in Table VII below:

*Table VII*

| Sample No. | Boiling Time | B.E.T., square meters per gram | NaCl, Percent | Alkalinity, Percent Na | pH | Tensile, lbs. per square inch | Tear, lbs. per inch |
| --- | --- | --- | --- | --- | --- | --- | --- |
| A | Unboiled Slurry | 181 | 0.03 | 1.43 | 9.9 | 1,950 | 190 |
| C | Boiled 30 min | 173 | 0.07 | 0.96 | 9.6 | 2,890 | 230 |
| D | Boiled 60 min | 163 | 0.06 | 0.94 | 9.3 | 3,160 | 280 |
| E | Boiled 4 hours | 176 | 0.01 | 0.83 | 9.2 | 3,280 | 290 |
| F | Boiled 20 hours | 164 | 0.02 | 0.98 | 9.4 | 3,160 | 290 |
| G | Boiled 44 hours | 167 | 0.02 | 1.10 | 9.5 | 2,890 | 320 |

EXAMPLE X

Still another series of samples prepared in accordance with the present process was treated with various reagents to determine the relative effectiveness of the different reagents in reducing the sodium content of the samples. These samples were prepared as follows:

Samples A–E were prepared according to the procedure of Example IV, through the step of filtering the boiled slurry and reslurrying the filter cake, except that the following minor changes were made:

Silicate concentration as grams per liter Na₂O --- 20.2
Sodium chloride concentration, grams/liter NaCl - 18.19
Carbon dioxide in gas, percent by volume ------ 38
Carbonation time, hours ---------------------- 5
Total volume before carbonation, gallons ------ 2770

Five samples of the resulting slurry designated A–E and containing 6.8 grams per liter of Na₂O were treated as follows:

*Sample A.*—332 cc. of 3.5 N HCl was added to 6 liters of slurry.

*Sample B.*—62 grams of NH₄Cl was added to 6 liters of slurry. The NH₄Cl was dissolved in a small amount of water before adding to the slurry.

*Sample C.*—200 grams of NH₄OH was added to 6 liters of slurry. The NH₄OH contained a minimum of 28 percent NH₃.

*Sample D.*—366 cc. of RH liquor was added to 6 liters of slurry. RH liquor is an intermediate solution from the Solvay soda process that is essentially aqueous ammonium chloride. The RH liquor here used contained 12.4 grams/liter of free NH₃, 55.4 grams/liter of NH₃ as NH₄Cl, and 71.6 grams/liter of NaCl.

*Sample E.*—This sample comprises 6 liters of slurry without added reagents.

Samples A–E were mixed well, then filtered and washed twice using 2 liters of tap water for each wash. The samples were dried at 105° C. in a circulating air oven and then micropulverized. The analyses of these samples is shown in Table VIII below.

Sample F was prepared by a procedure like that of Example IV but using 2650 gallons of solution containing 20.34 grams/liter of Na₂O as sodium silicate, 17.42 grams/liter of NaCl, and 5 hours' carbonation with 38 percent CO₂. A sample of boiled slurry comprising 18.9 liters was filtered and washed twice with approximately 4 liters of water for each wash. The filter cake was reslurried to 24 liters total volume and then contained 2.81 grams/liter of Na₂O. Then 671 cc. of 3.25 N RH liquor was added and the mixture was boiled under agitation for 90 minutes. The slurry was filtered and washed until the effluent filtrate gave only a faint reaction with silver nitrate-nitric acid solution. The filter cake was dried at 105° C. in a circulating air oven, micropulverized and conditioned at 73.5° F. and 50 percent humidity prior to compounding.

Sample G was prepared like sample F except that the reslurried filter cake was not treated with RH liquor and boiled but rather its pH was adjusted to 7 with 3.5 N HCl, after which the slurry was filtered, washed, and dried.

Analyses of these samples are given in Table VIII on next page.

Table VIII

| Sample No. | Reagent | Equivalent Added,[1] Percent | Alkalinity, Percent Na | pH | CaO, Percent | NaCl, Percent | BET | Tensile, lbs. per square inch | Tear, lbs. per inch |
|---|---|---|---|---|---|---|---|---|---|
| A | HCl | 88 | 0.34 | 6.9 | 0.11 | 0.77 | | | |
| B | NH₄Cl | 88 | 1.00 | 9.1 | 0.17 | 0.56 | | | |
| C | NH₄Cl | 250 | 1.60 | 10.0 | 0.21 | .01 | | | |
| D | RH Liquor | 88 | 1.10 | 9.4 | 0.20 | 0.38 | | | |
| E | H₂O | | 2.16 | 10.4 | 0.19 | 0.14 | | | |
| F | RH liquor before boiling | 100 | 0.58 | 8.5 | | .01 | 151 | 3,180 | 300 |
| G | HCl | 94.3 | 0.50 | 8.5 | | 0.68 | | 3,380 | 220 |

[1] Equivalent added = $\frac{\text{equivalent of reagent added}}{\text{equiv. of Na}_2\text{O in the slurry}} \times 100$.

EXAMPLE XI

A series of four samples designated as A–D was prepared showing the effect of carrying out the present heating step in various media. These samples were prepared in general according to the procedure of Example III except that 30 grams per liter of sodium chloride was used and the carbon dioxide was introduced at the rate of 24 cubic feet per hour for 90 minutes. At the end of this time, the resulting slurry was divided into four portions and treated as follows:

*Sample A.*—This sample was filtered and the filter cake washed. It was then reslurried in water and the pH adjusted to 6.8 with 155 cc. of 3.5 N hydrochloric acid. The pigment was again washed until nearly chloride free. This preparation represents an "unboiled pigment."

*Sample B.*—This slurry was filtered, washed, then reslurried and boiled for 60 minutes. After cooling, the slurry was adjusted to pH 6.8 with 168 cc. of 3.5 hydrochloric acid. The pigment was washed again until nearly salt free.

*Sample C.*—This slurry was filtered and the filter cake washed and reslurried. The new slurry was adjusted to pH 6.8 with 155 cc. 3.5 N hydrochloric acid. The acidified slurry was filtered and washed until nearly salt free, then reslurried and boiled for 60 minutes, after which it was again filtered.

*Sample D.*—This slurry was boiled for 60 minutes and then filtered and washed. The filter cake was reslurried and the pH adjusted to 7.0 with 140 cc. 3.5 N hydrochloric acid. The acidified slurry was filtered and washed until nearly salt free.

In all cases, the wet filter cakes were separately dried at 105° C. in a forced draft laboratory oven, then micropulverized and air conditioned. Analyses and compounding results on these samples are given in Table IX below:

Table IX

| Sample No. | Preparation Variables | BET area, square meters per gram | Alkalinity, Percent Na | pH | Tensile, lbs. per square inch | Tear, lbs. per inch |
|---|---|---|---|---|---|---|
| A | Washed, pH adjusted, washed, not boiled | 338 | 0.62 | 8.5 | 2,070 | 290 |
| B | Washed, boiled, pH adjusted, washed | 172 | 0.74 | 8.3 | 2,810 | 290 |
| C | Washed, pH adjusted, washed, boiled | 174 | 0.70 | 8.5 | 3,050 | 330 |
| D | Boiled, pH adjusted, washed | 145 | 0.65 | 8.6 | 2,940 | 290 |

EXAMPLE XII

A stoneware crock provided with a motor-driven agitator and stainless steel steam coil was charged with 48 liters of a solution containing 34.6 grams per liter of sodium silicate and 41.7 grams per liter of sodium chloride. The solution was heated to and maintained at 60° C. and 3.5 normal hydrochloric acid added thereto with stirring. The quantity of acid added was that theoretically required to neutralize 99 percent of the Na₂O of the sodium silicate, and the acid was added at a uniform rate over a period of about 5 minutes.

Upon addition of the acid, silica precipitated to form a slurry. When addition of the acid was complete, a sample was withdrawn (designated sample A herein) and the remainder of the slurry was heated to 80° C. for some hours. Slurry samples were taken at the end of 5, 24, and 48 hours of heating, these samples being designated herein as B, C, and D, respectively.

The four slurry samples were filtered under suction and washed free from electrolytes with warm water. The filter cake in each case was dried in a forced draft laboratory oven at 105 to 110° C. The dried material was micropulverized, air conditioned at 25° C. and 50 percent relative humidity, and incorporated in GR–S rubber with the results given in Table X below:

Table X

| Sample No. | Heating Time (Hours) | pH | Tensile, lbs. per square inch | Tear, lbs. per inch |
|---|---|---|---|---|
| A | 0 | 6.8 | 2,200 | 280 |
| B | 5 | 8.05 | 3,020 | 340 |
| C | 24 | 7.0 | 2,450 | 320 |
| D | 48 | 8.1 | 2,680 | 290 |

EXAMPLE XIII

About 2.5 liter solutions of sodium silicate having the composition $Na_2O(SiO_2)_{3.36}$ and containing the silicate and sodium chloride concentrations set forth in the table (next page) were made up in a 5-liter, three-necked flask. Each solution was allowed to age for 45 minutes and then pure carbon dioxide was bubbled into the solution at a uniform rate over the time specified in the table until the slurry had a pH of 7. During this treatment, the temperature was held constant. After carbonation was completed, each slurry was boiled for one hour and the silica recovered and dried at 105° C. Thereupon, the surface area (B.E.T.) of the silica was measured. The results were as follows:

Table XI

| NaCl Concentration, percent by weight of Solution | Rate of Carbonation, Minutes | Temperature, °C. | Surface Area, square meters per gram | |
|---|---|---|---|---|
| | | | 58 grams of $SiO_2$ per liter | 27 grams of $SiO_2$ per liter |
| 1 | 20 | 25 | | 335 |
| 3 | 20 | 25 | 192 | 290 |
| 4 | 20 | 25 | 112 | 187 |
| 5 | 20 | 25 | 76 | 115 |
| 1 | 120 | 25 | 223 | 302 |
| 2 | 120 | 25 | 129 | 285 |
| 3 | 120 | 25 | 79 | 150 |
| 0 | 1,400 | 25 | 219 | |
| 1 | 1,400 | 25 | 158 | 270 |
| 2 | 1,400 | 25 | 62 | 150 |
| 1 | 20 | 50 | 225 | 375 |
| 2 | 20 | 50 | 198 | 310 |
| 3 | 20 | 50 | 133 | 250 |
| 4 | 20 | 50 | 70 | 145 |
| 1 | 120 | 50 | 230 | 340 |
| 2 | 120 | 50 | 97 | 212 |
| 3 | 120 | 50 | 43 | 137 |
| 0 | 1,400 | 50 | 204 | |
| 1 | 1,400 | 50 | 110 | 253 |
| 2 | 1,400 | 50 | 28 | 80 |
| 0 | 20 | 75 | 279 | 312 |
| 1 | 20 | 75 | 180 | 310 |
| 2 | 20 | 75 | 100 | 225 |
| 0 | 120 | 75 | 226 | 320 |
| 1 | 120 | 75 | 119 | 212 |
| 2 | 120 | 75 | 36 | 75 |
| 0 | 1,400 | 75 | 101 | 240 |
| 1 | 1,400 | 75 | 21 | 130 |
| 0 | 20 | 100 | 148 | 215 |
| 1 | 20 | 100 | 105 | 165 |
| 2 | 20 | 100 | 20 | 95 |
| 0 | 120 | 100 | 81 | 220 |
| 1 | 120 | 100 | 11 | 110 |
| 0 | 1,400 | 100 | 12 | 140 |
| 1 | 1,400 | 100 | 11 | 70 |

EXAMPLE XIV

Sufficient sodium silicate solution, $Na_2O \cdot (SiO_2)_{3.3}$, was added to a 5-liter flask to provide 250 grams of $Na_2O \cdot (SiO_2)_{3.3}$ in the flask. One liter of water was added and the mixture was agitated. The solution was heated to the desired temperature and the desired amount of sodium chloride was added. The solution, which contained 10 percent by weight of sodium silicate, was aged for 45 minutes.

After aging, 500 cc. of a solution of hydrochloric acid containing enough HCl to neutralize the sodium silicate was added to the silicate solution, while maintaining the solution at the desired temperature, over a period of 2 hours.

The conditions of two runs and results therefrom appear in the following table:

Table XII

| Run No. | NaCl Concentration, percent by weight of Silicate Solution | Acidification Temperature, °C. | Acidification Rate, Minutes | Surface Area, Square Meters per gram |
|---|---|---|---|---|
| 1 | 1.5 | 50 | 120 | 71 |
| 2 | 1.5 | 50 | 120 | 74 |

EXAMPLE XV

The process of Example XIV was repeated except that HCl gas was diluted with an equal volume of nitrogen and enough of this mixture was introduced over a period of 2 hours at the conditions designated to neutralize the sodium silicate. The results obtained were as follows:

Table XIII

| Run No. | NaCl Concentration, Percent by weight of Silicate Solution | Acidification Temperature, °C. | Acidification Rate, Minutes | Surface Area, Square Meters Per Gram |
|---|---|---|---|---|
| 1 | 1.0 | 75 | 120 | 51.7 |
| 2 | 0 | 75 | 120 | 153.0 |

EXAMPLE XVI

Seventeen thousand gallons of a sodium silicate solution is placed in a 50,000-gallon tank. This solution contains the sodium silicate $Na_2O \cdot (SiO_2)_{3.3}$ in amount sufficient to establish an $Na_2O$ concentration of 20.3 grams per liter. This solution contains no sodium chloride except that minor amount (less than 0.08 percent) usually present in commercial sodium silicate. The solution is held at a temperature of 167° F.±5°. Carbon dioxide gas containing 10.0 to 10.8 percent of $CO_2$, the balance being nitrogen and air, is introduced into the solution at a gas temperature of 115 to 145° F. at a rate sufficient to provide 1250 cubic feet of the carbon dioxide gas per minute (measured at 760 millimeters pressure and 0° C.). This gas is introduced directly under a turboagitator in a manner to achieve uniform distribution of gas, and the mixture is vigorously agitated. Carbon dioxide introduction is continued at this rate for 8½ hours, at which time about 120 to 140 percent of the theoretical amount of $CO_2$ has been introduced. After this period of 8½ hours, the rate of introduction of carbon dioxide is reduced to 400 cubic feet per minute and the solution is boiled for 1½ hours. The slurry is then washed and the silica is recovered. The silica has a surface area of 140 to 150 square meters per gram.

EXAMPLE XVII

Sodium silicate solutions were prepared using sodium silicates of different ratios of $NaO_2$ to $SiO_2$, as shown in the table below. In all cases, sufficient silicate was used to provide 974 grams of $Na_2O$ in 48 liters of solution.

The solutions were placed in a 25-gallon, open-topped kettle provided with heating and cooling coils and a turbo-mixer having one 6-inch three-bladed impeller and a gas inlet one inch below the impeller.

Pure carbon dioxide was metered through the inlet at a rate of 3 cubic feet per hour (measured at 0° C. and 750 millimeters pressure) for 6 hours. The solutions were vigorously agitated and held at 80° C. during the carbonation. Tap water was added from time to time to compensate for evaporation and to maintain the original volume.

After 6 hours, the resulting slurry was boiled for one hour while introducing carbon dioxide at 1.5 cubic feet per hour (measured at 0° C. and 760 mm. pressure).

After boiling, all samples were filtered and washed with 8 gallons of water. The filter cake was reslurried and adjusted to pH 6 with hydrochloric acid. The slurry was filtered and the cake washed until the wash water was chloride free. The resulting silica was dried at 110° C. and passed through a micropulverizer.

The following table sets forth the silica and $Na_2O$ concentrations of the sodium silicate solutions used in these experiments.

Table XIV

| Total $Na_2O$ in Solution, grams | $Na_2O$ Concentration, grams per liter | Total $SiO_2$ in Solution, grams | $SiO_2$ Concentration, grams per liter | Molar Ratio, $Na_2O$ to $SiO_2$ |
|---|---|---|---|---|
| 974 | 20.3 | 2,295 | 47.7 | 2.435 |
| 974 | 20.3 | 3,050 | 63.8 | 3.25 |
| 974 | 20.3 | 1,559 | 32.5 | 1.655 |
| 974 | 20.3 | 2,442 | 50.9 | 2.59 |
| 974 | 20.3 | 2,828 | 58.9 | 2.99 |
| 974 | 20.3 | 3,142 | 65.5 | 3.33 |
| 974 | 20.3 | 3,811 | 79.4 | 4.00 |

EXAMPLE XVIII

Sodium silicate solution containing $Na_2O(SiO_2)_{3.3}$ in a concentration corresponding to 20.3 grams of $Na_2O$ per liter was reacted with 12 Normal hydrochloric acid to a pH of 7 by adding the acid to the silicate in 292 minutes, the temperature of the silicate being kept at 65° C.

A portion of this slurry was boiled for 60 minutes and a sample (sample No. 1) thereof was adjusted to pH 6, filtered, washed and dried. A second sample (sample No. 2) was adjusted to pH 2, filtered, washed, reslurried in water at pH 2, filtered and dried.

The remainder of the slurry was adjusted to pH 2 with HCl. A sample of this slurry (same No. 3) was filtered, washed and dried. A further sample (sample No. 4) of this slurry was boiled for 60 minutes at pH 2. Another sample (sample No. 5) of this slurry was adjusted to pH 7 with NaOH and boiled for 60 minutes. The product was washed and dried.

The surface area of the products was found to be as follows:

| | Square meters per gram |
|---|---|
| Sample No. 1 | 152 |
| Sample No. 2 | 157 |
| Sample No. 3 | 408 |
| Sample No. 4 | 392 |
| Sample No. 5 | 154 |

The settling and/or filtering properties of the silica herein contemplated may be materially improved by addition to the slurry of a hydrated aluminum oxide or a water soluble aluminum salt. Typical salts which may be used are aluminum chloride, aluminum sulphate, sodium aluminate, and like hydrolyzable salts.

The amount of aluminum salt to be used should be relatively small since a product which is largely silica is desired and since $Al_2O_3$ tends to be established in the silica by the treatment. Usually, an amount equal to about 1 to 5 percent by weight of aluminum compound (computed on the basis of its $Al_2O_3$ content) is used, based upon the weight of $SiO_2$ (anhydrous basis) in the slurry.

As a consequence of this aluminum treatment, the silica settles or filters with reasonable rapidity. Moreover, the silica obtained contains a small amount of $Al_2O_3$, usually in the range of one mole of $Al_2O_3$ per 25 to 300 moles of $SiO_2$. Silica containing this amount of $Al_2O_3$ has certain advantages in that it appears to have less toxicity than some purer silicas. Moreover, data have shown that improved dispersing characteristics and improved strength characteristics in rubber are attained thereby.

EXAMPLE XIX

Silica was precipitated and boiled as in Example XVI. Sixteen hundred gallons of the boiled slurry containing 6.4 grams per liter of $Na_2O$ was placed in a tank and 168 pounds of aluminum sulphate ($Al_2SO_4 \cdot 18H_2O$) was added. Hydrochloric acid was then added to a slurry pH of 5.7 and after one-half hour, 20 pounds of lime was added, the slurry then having a pH of 6.95.

EXAMPLE XX

Silica is precipitated and boiled as in Example XVI. The slurry is placed in a Dorr thickener. Enough aluminum sulphate is added to the slurry to give a content of 2 to 4 percent of $Al_2O_3$, based upon the dry silica in the product. The product is then thickened by conventional decantation, filtered, and repulped in water to about 10 percent by weight of solids. Enough hydrochloric acid was added to the repulped slurry to adjust the pH of the slurry to 5.7. The resulting slurry is thickened and filtered and the product dried. The dry product contains 2 to 4 percent by weight of $Al_2O_3$.

The abrasion resistance of rubber compositions containing this product has been observed to be higher than silica which does not contain aluminum.

EXAMPLE XXI

Samples of silica slurry precipitated and boiled as in Example XVI and containing 1.3 percent by weight of silica were placed in a conventional flocculating apparatus.

Reagents in the amounts indicated in the following table were added:

*Table XV*

| Sample No. | Amount of Sodium Aluminate Added, Percent by weight | Amount of Aluminum Sulphate Added, Percent by weight |
|---|---|---|
| 1 | 2.0 | 2.0 |
| 2 | 3.0 | 1.16 |
| 3 | 3.0 | 0.58 |
| 4 | 3.0 | 0.29 |
| 5 | 3.0 | 0 |

In the above tests, the amount of aluminum compound is expressed in terms of the percent by weight of $Al_2O_3$ introduced as aluminum sulphate and/or sodium aluminate on the basis of the $SiO_2$ in the slurry. It was found that each sample flocculated well. However, samples which contained 0.3 percent aluminum sulphate and 3 percent sodium aluminate settled better than did samples containing 4 percent aluminum sulphate.

EXAMPLE XXII

A silica pigment was prepared essentially in accordance with the procedure of Example IV with the following changes: 2600 gallons of sodium silicate solution containing 18 grams per liter of sodium chloride and 20 grams per liter of $Na_2O$ was used. The carbonation rate was 3 hours, at which time sufficient carbon dioxide had been introduced to convert 20 to 30 percent of the $Na_2O$ content to bicarbonate. Following the carbonation, the slurry was boiled for one hour, filtered and washed. The filter cake was reslurried in water and ½ percent by weight of aluminum sulphate added thereto. Then sufficient hydrochloric acid was added to bring the pH to substantially 5.7. Thereafter, the slurry was filtered, washed, reslurried in water, refiltered, and dried.

The pigment thus prepared had unusually good dispersion characteristics in rubber.

According to a further embodiment of the invention, it has been found that reaction of the precipitated silica with an oxide or hydroxide of calcium results in an improved product. As a consequence of this process, the pH of the product is stabilized above 7.

The desired reaction may be effected by mixing the silica with milk of lime. The amount of calcium added may be varied widely and compositions corresponding to calcium silicate may be used. In such a case, a very finely divided, readily dispersible calcium silicate is obtained.

The calcium oxide treatment preferably is conducted after the silica has been extracted to remove sodium and while the pigment is acidic (pH below 7), usually below 5 or 6. The calcium oxide serves to raise the pH of the slurry above about 7, usually in the range of 7 to 9, as well as to introduce CaO into the silica. A silica slurry to which an aluminum compound has been added, as discussed above, will contain both CaO and $Al_2O_3$ in the proportions set forth.

Certain tests show that the abrasion resistance of rubber containing silica which was prepared by reacting the silica with the small amounts of CaO herein contemplated, without use of aluminum compound, is superior to that obtained when the aluminum compound is used. Hence, omission of the aluminum compound offers advantages insofar as the material produced is concerned, even though filtration may be slower.

While reaction of silica with calcium hydroxide is advantageous, the metal oxide of other metals of group II, series 3 to 8, including the oxides and hydroxides of magnesium, barium, strontium, and zinc, may be used.

The following examples are illustrative:

EXAMPLE XXIII

Forty-eight liters of a solution containing sodium silicate of the composition $$Na_2O \cdot (SiO_2)_{3.3}$$

in such concentration that the $Na_2O$ content thereof was 20.3 grams per liter was heated to 90° C. Carbon dioxide at a rate of 3 cubic feet per hour was introduced into the solution for 6 hours. Thereafter, the resulting slurry was boiled for one hour.

The slurry was then divided into three portions. Portion No. 1 was filtered and washed to remove soluble salts. After washing, the product was reslurried and sufficient 3.5 Normal hydrochloric acid was added to adjust the pH of the slurry to 5.4. Sufficient milk of lime was added to this slurry to raise the pH thereof to 7.3.

Portion No. 2 was filtered and washed, as in the case of portion No. 1, and the pH thereof adjusted to 4 with 3.5 Normal hydrochloric acid.

The remainder of the slurry was filtered, washed, and the filter cake was divided into portions Nos. 3 to 6.

Portion No. 3, containing about 500 grams of $SiO_2$, was reslurried to form 10 liters of slurry and the pH of the slurry was adjusted to 4 with HCl. 4.8 liters of calcium hydroxide slurry containing 460 grams of CaO was added and the pH of the slurry rose to 12.

Portion No. 4 was treated in the same way as portion No. 3 except that 230 grams of CaO was added.

Portion No. 5 was treated in the same way except that 153 grams of CaO was added.

Portion No. 6 was treated in the same way except that 115 grams of CaO was added.

All samples were filtered and dried at 110° C. and the dry products pulverized.

EXAMPLE XXIV

Silica was precipitated as in Example XVI at a carbonation time of 8½ hours.

Sixteen hundred and sixty gallons of the resulting boiled slurry containing 10 percent by weight of solids and 6.4 grams per liter of $Na_2O$ was placed in a tank and hydrochloric acid added until the pH was 5.65. The slurry was digested for one-half hour and 12 pounds of calcium hydroxide slurried in a small amount of water. The pH of the resulting slurry was 6.5. The slurry was filtered and the product washed and dried in a drier heated with steam at a steam pressure of 110 pounds per square inch.

The abrasion resistance of vulcanized rubber containing this product has been observed to be superior to compositions containing silica which contain no calcium and also to those containing silica which contain aluminum.

EXAMPLE XXV

The apparatus used in this experiment consisted of a 5-liter, three-necked flask fitted with a suitable stirrer and means for introducing carbon dioxide into the lower portion of the flask. 2.65 kilograms of a sodium silicate solution containing 1.6 percent by weight $Na_2O$ as sodium silicate, 5.3 percent by weight of $SiO_2$, and 0.75 percent by weight of NaCl was prepared by adding 1740 grams of deionized water, 20 grams of sodium chloride, and 890 grams of sodium silicate, having the composition 4.87 percent $Na_2O$ and 15.7 percent by weight $SiO_2$, into the flask and stirring the mixture thoroughly. The mixture was then heated to 75° C. and, while agitating continuously and vigorously, gaseous carbon dioxide was introduced at a rate of 17 liters per hour, measured according to standard conditions of temperature and pressure. This is enough carbon dioxide to neutralize 100 percent of the $Na_2O$ content of the solution and to produce $Na_2CO_3$ in one hour. The carbon dioxide introduction was continued at this rate for a period of 30 minutes, whereupon the carbon dioxide introduction was stopped. At this point, approximately 50 percent of the $Na_2O$ had been reacted. Thereupon, 34 milliliters of hydrochloric acid solution containing 37 percent by weight of HCl was added over a period of 5 minutes and the resulting slurry was boiled for one hour. The slurry thus obtained had a pH of 9.3. The silica was recovered from this slurry by filtration and was washed and dried at 105° C. and pulverized. The resulting silica was a very finely divided product having a surface area of 165 square meters per gram.

EXAMPLE XXVI

The following table summarizes conditions of a plurality of experiments performed as described above by reacting carbon dioxide with sodium silicate solutions containing 5.07, 10.15, 20.3, and 30.45 grams of $Na_2O$ per liter as sodium silicate. It will be noted that in most cases the best results were obtained when the NaCl content was below about 50 to 55 grams per liter.

*Table XVI*

| Run No. | NaCl, grams per liter | $Na_2O$, grams per liter | Temperature of Reaction, °C. | Rate of Addition of stoichiometric amount, minutes | Surface Area, B.E.T., m.²/g. | Tensile, pounds per square inch |
|---|---|---|---|---|---|---|
| 1 | 30 | 20.3 | 25 | 30 | 158 | 3,330 |
| 2 | 20 | 20.3 | 25 | 30 | 218 | 1,530 |
| 3 | 40 | 20.3 | 25 | 30 | 111 | 2,540 |
| 4 | 20 | 20.3 | 55 | 30 | 120 | 3,090 |
| 5 | 10 | 20.3 | 55 | 30 | 220 | 1,020 |
| 6 | 30 | 20.3 | 55 | 30 | 67 | 2,440 |
| 7 | 10 | 20.3 | 85 | 30 | 98 | 2,770 |
| 8 | 5 | 20.3 | 85 | 30 | 138 | 3,230 |
| 9 | 20 | 20.3 | 85 | 30 | 29 | 1,570 |
| 10 | 30 | 20.3 | 25 | 240 | 74 | 2,270 |
| 11 | 20 | 20.3 | 25 | 240 | 115 | 3,020 |
| 12 | 40 | 20.3 | 25 | 240 | 104 | 1,380 |
| 13 | 20 | 20.3 | 55 | 240 | 43 | 2,130 |
| 14 | 10 | 20.3 | 55 | 240 | 120 | 3,150 |
| 15 | 5 | 20.3 | 55 | 240 | 188 | 2,330 |
| 16 | 20 | 20.3 | 85 | 240 | 11 | 300 |
| 17 | 10 | 20.3 | 85 | 240 | 21 | 1,250 |
| 18 | 5 | 20.3 | 85 | 240 | 49 | 2,210 |
| 19 | 10 | 20.3 | 25 | 240 | 225 | 750 |
| 20 | 2.5 | 20.3 | 85 | 30 | 17 | 2,330 |
| 21 | 50 | 20.3 | 25 | 15 | 98 | 1,910 |
| 22 | 40 | 20.3 | 25 | 15 | 119 | 2,640 |
| 23 | 30 | 20.3 | 25 | 15 | 159 | 2,940 |
| 24 | 20 | 20.3 | 25 | 15 | | |
| 25 | 70 | 10.15 | 25 | 15 | 87 | 1,090 |
| 26 | 50 | 10.15 | 25 | 15 | 121 | 2,180 |
| 27 | 30 | 10.15 | 25 | 15 | 236 | 840 |
| 28 | 40 | 10.15 | 25 | 15 | 178 | 3,150 |
| 29 | 70 | 5.07 | 25 | 7.5 | 80 | 1,380 |
| 30 | 50 | 5.07 | 25 | 7.5 | 155 | 2,45 |
| 31 | 40 | 5.07 | 25 | 7.5 | | |
| 32 | 60 | 5.07 | 25 | 7.5 | 103 | 1,770 |
| 33 | 70 | 2.54 | 25 | 3.75 | 87 | 1,630 |
| 34 | 0 | 20.3 | 85 | 240 | 106 | 3,160 |
| 35 | 10 | 30.45 | 25 | 60 | 155 | 2,000 |
| 36 | 20 | 30.45 | 25 | 60 | 113 | 2,450 |
| 37 | 0 | 30.45 | 85 | 60 | 78 | 2,990 |
| 38 | 20 | 20.3 | 25 | 480 | 100 | 2,570 |
| 39 | 10 | 20.3 | 25 | 480 | 201 | 1,620 |
| 40 | 10 | 20.3 | 55 | 480 | 92 | 2,310 |
| 41 | 0 | 20.3 | 55 | 480 | 217 | 1,120 |
| 42 | 10 | 30.45 | 25 | 240 | 143 | 2,750 |
| 43 | 10 | 30.45 | 85 | 120 | 17 | 1,460 |
| 44 | 0 | 30.45 | 85 | 120 | 66 | 2,520 |
| 45 | 15 | 20.3 | 25 | 480 | 108 | 3,150 |
| 46 | 5 | 20.3 | 55 | 480 | 158 | 3,130 |
| 47 | 10 | 30.45 | 25 | 120 | 214 | 2,200 |
| 48 | 20 | 30.45 | 25 | 120 | 123 | 2,440 |
| 49 | 10 | 30.45 | 85 | 60 | 40 | 2,110 |
| 50 | 0 | 30.45 | 85 | 30 | 141 | 3,090 |
| 51 | 10 | 30.45 | 85 | 30 | 55 | 2,480 |
| 52 | 0 | 30.45 | 85 | 240 | 38 | 1,970 |
| 53 | 20 | 30.45 | 25 | 240 | 167 | 2,380 |
| 54 | 10 | 30.45 | 25 | 30 | 191 | 1,230 |
| 55 | 20 | 30.45 | 25 | 480 | 91 | 2,030 |
| 56 | 10 | 30.45 | 25 | 480 | 121 | 2,840 |
| 57 | 0 | 30.45 | 25 | 120 | | |
| 58 | 5 | 30.45 | 25 | 120 | | |
| 59 | 5 | 30.45 | 25 | 240 | 197 | 1,800 |
| 60 | 20 | 30.45 | 25 | 30 | 160 | 2,910 |
| 61 | 0 | 30.45 | 25 | 1,440 | 163 | 2,480 |
| 62 | 60 | 5.07 | 25 | 120 | 86 | |
| 63 | 60 | 5.07 | 50 | 120 | 24 | |
| 64 | 60 | 5.07 | 85 | 120 | 19 | |

EXAMPLE XXVII

The following tests were made measuring the apparent density (bulk density) of silicas produced by reaction of sodium silicate having the composition $$Na_2O \cdot (SiO_2)_{3.25}$$

with 3.5 Normal HCl solution, adding the amount of acid equivalent to 102 percent of the $Na_2O$ content of the sodium silicate.

*Table XVII*

| Run No. | NaCl grams per liter | Silicate Concentration as grams of $SiO_2$ per liter | Temperature, °C. | Acidification Time Minutes | Acidification Time Seconds | Bulk Density, grams per cc. | Surface area, m.²/g. | pH |
|---|---|---|---|---|---|---|---|---|
| 1 | 40 | 17.1 | 60 | 2 | 45 | | 306 | 6.5 |
| 2 | 40 | 17.1 | 60 | 5 | 40 | .252 | 395 | 3.5 |
| 3 | 40 | 17.1 | 60 | 60 | 40 | .172 | 58 | 4.9 |
| 4 | 80 | 17.1 | 60 | 1 | 30 | .178 | 324 | 4.6 |
| 5 | 80 | 17.1 | 60 | 5 | 45 | .183 | 293 | 4.3 |
| 6 | 20 | 34.2 | 60 | 5 | 40 | .391 | 368 | 6.1 |
| 7 | 20 | 34.2 | 60 | 60 | | .259 | 367 | 3.7 |
| 8 | 40 | 34.2 | 60 | 5 | 40 | .267 | 523 | 4.8 |
| 9 | 40 | 34.2 | 60 | 60 | | .188 | 235 | 3.3 |
| 10 | 80 | 34.2 | 60 | 0 | 40 | .183 | 425 | 4.55 |
| 11 | 80 | 34.2 | 60 | 1 | 35 | .169 | 357 | 5.25 |
| 12 | 80 | 34.2 | 60 | 5 | 40 | .179 | 360 | 4.9 |
| 13 | 20 | 68.4 | 60 | .5 | 40 | .261 | 352 | 4.3 |
| 14 | 20 | 68.4 | 60 | 60 | | .169 | 246 | 3.8 |
| 15 | 40 | 68.4 | 60 | 5 | 40 | .193 | 473 | 5.2 |
| 16 | 40 | 68.4 | 60 | 60 | | .265 | 510 | 4.1 |
| 17 | 80 | 68.4 | 60 | 2 | 45 | .217 | 504 | 3.9 |
| 18 | 80 | 68.4 | 60 | 5 | 40 | .239 | 102 | 3.2 |
| 19 | 20 | 17.1 | 90 | 5 | 40 | .293 | 327 | 3.8 |
| 20 | 20 | 17.1 | 90 | 60 | | .189 | 207 | 4.3 |
| 21 | 20 | 34.2 | 90 | 1 | 30 | .373 | 362 | 4.15 |
| 22 | 20 | 34.2 | 90 | .5 | 40 | .235 | 167 | 3.1 |
| 23 | 20 | 34.2 | 90 | 60 | | .183 | 33 | 4.4 |
| 24 | 40 | 136.8 | 60 | 9 | 30 | .202 | 646 | 3.5 |
| 25 | 80 | 17.1 | 60 | 5 | 40 | .203 | 295 | 4.0 |
| 26 | 80 | 34.2 | 60 | .5 | 40 | .197 | 413 | 4.4 |

EXAMPLE XXVIII

The process of Example XVI was performed except that the temperature of the reaction mixture was varied in a series of tests. The results were as follows:

*Table XVII–A*

| Precipitation Temperature, °C. | Surface Area, B.E.T., m.²/g. | pH | Tensile, pounds per square inch | Tear, pounds per inch |
|---|---|---|---|---|
| 70 | 180 | 7.6 | 3,080 | 450 |
| 80 | 121 | 5.0 | 2,810 | 290 |
| 90 | 70.8 | 7.6 | 2,690 | 270 |
| 75 | 135 | 8.2 | 2,470 | 240 |

EXAMPLE XXIX

Solutions of sodium silicate, $Na_2O(SiO_2)_{3.3}$, having the concentration corresponding to the $Na_2O$ content set forth in the following table, were reacted with carbon dioxide at a uniform rate at the acidification times stated. The resulting silicas were recovered, dried, and micropulverized. The results were as follows:

*Table XVIII*

| Silicate Concentration, grams of $Na_2O$ per liter | Temperature of Silicate, °C. | Time over which Stoichiometric amount of acid added, minutes | Surface Area, m.²/g. | pH | Average Ultimate Particle Size, microns |
|---|---|---|---|---|---|
| 30.45 | 85 | 240 | 60 | 7.9 | 0.07–0.08 |
| 40.6 | 85 | 240 | 42 | 8.1 | 0.10 |
| 40.6 | 85 | 330 | 23 | 8.1 | 0.12–0.14 |

EXAMPLE XXX 14,324 grams of sodium silicate, $Na_2O(SiO_2)_{3.3}$ was diluted to 48 liters, producing a solution containing 20.3 grams of $Na_2O$ per liter, and heated to 75° C. A sulphuric acid solution of 5.12 normality was added to this solution at a rate of 26 cc. per minute while maintaining the temperature of the reaction mixture at 75° C. The precipitation of silica was complete after 108 minutes. Addition of acid was continued at the same rate until the pH of the reaction mixture fell to 9.3 (a total of 200 minutes). Thereupon, the resulting slurry was boiled for 60 minutes, filtered, the filter cake washed twice with water, and the pH adjusted to 6.0 by adding 400 cc. of 5.12 N sulphuric acid. The resulting product was recovered by filtration and drying.

When incorporated in GR–S rubber, according to the recipe of Example I, this pigment gave rubber having a tensile strength of about 3000 pounds per square inch.

EXAMPLE XXXI

Seventeen thousand gallons of sodium silicate diluted to a concentration of 40.6 grams per liter of $Na_2O$ and heated to a temperature of 167° F. was charged to a tank 18 feet in diameter to a depth of 8 feet. Carbon dioxide gas containing about 10.5 percent $CO_2$, the balance largely being nitrogen, was introduced into the silicate solution at a distance about 4 feet from the bottom of the pool and below the blade of a turboagitator at a rate of 1300 cubic feet per minute, measured at 70° F. and 760 millimeters pressure, for about 10 hours. Precipitation began to occur at about 2 hours and 26 minutes after the start of the carbonation. At 6.5 hours, enough carbon dioxide had been introduced to neutralize 100 percent of the $Na_2O$ to produce $Na_2CO_3$.

The resulting slurry was washed to remove about 90 percent of the alkali, acidified to a pH of about 4.5, and washed in a Dorr type thickener until the residual sodium chloride fell below one gram per liter. Thereafter, the resulting silica was recovered by filtration and drying at a temperature of about 100 to 125° C. The product was a very coarse, pulverulent material which is useful as an opacifying agent. The surface area of this product is approximately 40 square meters per gram.

EXAMPLE XXXII

A sodium silicate, $Na_2O(SiO_2)_{3.3}$ solution containing 20.3 grams of $Na_2O$ per liter as sodium silicate was heated to 70° C. and 12 N hydrochloric acid was added at a rate of 10.3 cc. per minute. Pigment precipitation took place after 103 minutes. Addition of acid was continued for a total of 283 minutes. The resulting slurry was boiled for 60 minutes, the pH adjusted to 6.05, and the precipitated silica was recovered by filtration and drying. The dry silica, when compounded in GR–S rubber, produced rubber having a tensile strength of 2990 pounds per square inch.

In addition to the above described processes, the silica, particularly before removal of Na$_2$O, may be treated with other electrolytes. For example, the silica may be treated with an alkaline earth metal chloride in order to replace the sodium on the silica by calcium, barium, magnesium, strontium, or the like. Various solutions of alkaline earth metal salts may be used for this purpose, including: calcium chloride, magnesium chloride, strontium chloride, barium chloride, and the corresponding nitrates and like water soluble salts. Furthermore, salts of other metals may be used. For example, aqueous solutions of iron chloride, chromium chloride, copper chloride, nickel chloride, cobalt chloride, or the corresponding soluble nitrates, sulphates, acetates, sulphites, phosphates, phosphites, and the like may be used, although some of these compounds may tend to impart a color to the silica. Other compounds which do not impart a color to the silica include the chlorides and nitrates and like water soluble salts of ammonium, lithium, zinc, and the like. It will be understood that the metal salt selected for this purpose should be chosen in the light of the ultimate use to which the silica pigment is to be put.

As previously explained, the pigments herein contemplated appear, under high magnification, as flocs or aggregates of individual silica particles. These flocs are highly porous and probably are loosely linked aggregates resembling, upon magnification, a bunch of grapes. The average ultimate particle size of the product is about 0.02 to 0.04 micron. However, the particles being aggregated, the flocs are somewhat larger.

Two types of water are present in this novel pigment. These types of water are termed "bound water" and "free water." The term "free water," as used herein, is intended to denote the water which may be removed from the silica pigment by heating the pigment at a temperature of 105° C. for a period of 24 hours in a laboratory oven. The term "bound water," as used herein, is intended to mean the amount of water which is driven off from a silica pigment by heating the pigment at ignition temperature, for example, 1000 to 1200° C. until no further water can be removed, minus the amount of free water in the pigment.

Although the present invention has been described with reference to specific details of certain embodiments thereof, it is not intended that such details shall be regarded as limiting the scope of the invention except insofar as included in the accompanying claims.

This application is a continuation-in-part of my co-pending applications Serial No. 227,284, filed May 19, 1951, now abandoned; Serial No. 250,570, filed October 9, 1951; Serial No. 277,759, filed March 21, 1952, now abandoned; Serial No. 308,249, filed September 6, 1952, now abandoned; and Serial No. 443,830, filed July 16, 1954.

What is claimed:

1. A method of preparing a finely divided, particulate, siliceous pigment capable of reinforcing GR–S rubber to produce rubber having a tensile strength of at least 2400 pounds per square inch which comprises forming a confined body of an aqueous solution of alkali metal silicate containing 10 to 150 grams of SiO$_2$ per liter of solution, gradually adding over a period of at least 5 minutes an amount of acidification agent having an anion which forms a water soluble compound with alkali metal to said solution in amount sufficient to precipitate silica in the form of flocs from the solution and to increase the mol ratio of the total SiO$_2$ in said body to unneutralized alkali metal oxide of said silicate to about 10, and at a rate fast enough to produce silica having a surface area not over 200 square meters per gram but slow enough to produce silica having a surface area of at least 75 square meters per gram, the average ultimate particle size of said silica being 0.015 to 0.04 micron, holding the temperature of the solution substantially constant during said addition, thereafter adding further acidification agent to reduce the alkali metal oxide content of the resulting pigment below 2 percent, and separating the resulting pigment from its mother liquor.

2. A method of preparing a finely divided, particulate, siliceous pigment capable of reinforcing GR–S rubber to produce rubber having a tensile strength of at least 2400 pounds per square inch which comprises forming a confined body of an aqueous solution of alkali metal silicate containing 10 to 150 grams of SiO$_2$ per liter of solution, gradually adding over a period of at least 5 minutes an amount of acidification agent having an anion which forms a water soluble compound with alkali metal to said solution in an amount sufficient to precipitate the silica in the form of flocs from the solution, and to increase the mol ratio of the total SiO$_2$ in said body to unneutralized alkali metal oxide in said silicate to about 10, at a rate fast enough to produce silica having a surface area not over 200 square meters per gram but slow enough to produce silica having a surface area of at least 75 square meters per gram, the average ultimate particle size of said silica being 0.015 to 0.04 micron, holding the temperature of the solution substantially constant during said addition, thereafter adding further acidification agent to reduce the Na$_2$O content of the resulting pigment below 2 percent, and heating the precipitated pigment in aqueous medium at a pH above 5 and temperature above 60° C. until the surface area thereof has stabilized.

3. The process of claim 1 wherein the alkali metal is sodium.

4. The process of claim 1 wherein the aqueous solution contains an alkali metal salt of a mineral acid which is at least as strong as sulphuric acid.

5. The process of claim 4 wherein the alkali metal salt is sodium chloride and the alkali metal silicate is sodium silicate.

6. The process of claim 1 wherein at least 90 minutes is required to add the first half of said acidification agent.

7. The process of claim 6 wherein the amount of said silicate solution is at least 1000 gallons.

8. The process of claim 1 wherein the silica after precipitation is treated with an electrolyte containing a cation which replaces sodium.

9. The process of claim 1 wherein the silica after precipitation and before drying is contacted with a member of the group consisting of oxides and hydroxides of Group II Series 3 to 8 and water soluble salts of a metal of the group consisting of calcium, magnesium, barium, strontium, aluminum, ammonium, cobalt, iron, chromium, copper, nickel and zinc.

10. A method of stabilizing the surface area of silica having an average ultimate particle size below 0.1 micron and which is produced by introducing carbon dioxide into an aqueous sodium silicate solution containing 20.3 grams per liter of Na$_2$O as Na$_2$O(SiO$_2$)$_{3.3}$ and being substantially free of sodium chloride, while maintaining the temperature at 75° C., the rate of carbon dioxide introduction being such that 120 percent of the stoichiometric amount of carbon dioxide is introduced in 8½ hours, and continuing carbon dioxide introduction for 8½ hours, which comprises heating the silica in an aqueous medium at a pH above 5 and at a temperature above 60° C. for at least 30 minutes.

11. The process of claim 10 wherein the temperature of heating is above 80° C.

12. A method of recovering a finely divided, precipitated silica capable of reinforcing GR–S rubber to produce rubber having a tensile strength of at least 2400 pounds per square inch and having a surface area of 25 to 200 square meters per gram, and which initially has been precipitated from an aqueous alkali metal silicate solution and is in the form of finely divided discrete particles, from an aqueous medium in which said silica has been precipitated, which comprises stabilizing said silica against change in surface area by subjecting said silica to the action of an aqueous medium at a pH not less than 5 and a temperature of at least 60° C. for a period of at least 30 minutes.

13. The process of claim 12 wherein the temperature of conditioning is not less than 80° C.

14. The process of claim 12 wherein the temperature of conditioning exceeds the temperature at which the silica has been precipitated.

15. A method of recovering silica according to claim 12 wherein the silica, after it has been stabilized according to claim 12, is subjected to the action of a strong aqueous mineral acid whereby to remove alkali metal therefrom.

16. A method of recovering silica according to claim 12 wherein the silica, after stabilization according to claim 12, is subjected to the action of an aqueous acid whereby to remove alkali therefrom.

17. The process according to claim 16 wherein the acid used to remove alkali has a dissociation constant above $1 \times 10^{-4}$.

18. The process of claim 12 wherein the silica has an ultimate particle size of 0.03 micron.

19. A method of preparing a siliceous product which comprises introducing carbon dioxide into an aqueous sodium silicate solution containing 20.3 grams per liter of $Na_2O$ as $Na_2O(SiO_2)_{3.3}$ and being substantially free of sodium chloride, while maintaining the temperature at 75° C., the rate of carbon dioxide introduction being such that 120 percent of the stoichiometric amount of carbon dioxide is introduced in 8½ hours, continuing carbon dioxide introduction at such rate for 8½ hours, and recovering the resulting silica.

20. A method of preparing a siliceous product which comprises introducing carbon dioxide into an aqueous sodium silicate solution containing 20.3 grams per liter of $Na_2O$ as $NaO(SiO_2)_{3.3}$ and being substantially free of sodium chloride, while maintaining the temperature at 75° C., the rate of carbon dioxide introduction being such that 120 percent of the stoichiometric amount of carbon dioxide is introduced in 8½ hours, continuing carbon dioxide introduction at such rate for 8½ hours, recovering the resulting silica, and stabilizing the resulting silica by heating it in an aqueous medium above 60° C. for a period of at least 30 minutes after precipitation has been completed.

21. A method of preparing finely divided silica which comprises introducing carbon dioxide into aqueous sodium silicate containing about 68 grams of silica, 20.3 grams of $Na_2O$, and about 20 grams of sodium chloride per liter to precipitate silica therefrom, introducing the carbon dioxide at such a rate as to supply in 4 hours the amount required to convert said sodium silicate into normal sodium carbonate, maintaining the temperature during carbonation at 25° C., and continuing the carbonation for a period of 5 hours to complete precipitation of the desired finely divided silica.

22. A method of preparing finely divided silica which comprises introducing carbon dioxide into an aqueous solution of sodium silicate containing 68 grams of silica and 30 grams of sodium chloride per liter while maintaining the temperature of the solution at 25° C., and introducing the stoichiometric amount of carbon dioxide required to react with said sodium silicate over a period of 60 minutes.

23. A method of preparing finely divided silica which comprises introducing carbon dioxide into an aqueous solution of sodium silicate containing 66 grams of $SiO_2$ per liter, 20.3 grams of $Na_2O$ per liter, and 10 grams of NaCl per liter, the rate of introduction of said carbon dioxide being sufficient to deliver the theoretical amount of carbon dioxide required to react with the $Na_2O$ of the sodium silicate in 24 hours, continuing the carbonation for the said period of 24 hours while maintaining the temperature of said solution at 35° C., and separating the precipitated silica from the solution.

24. A method of preparing finely divided silica which comprises introducting carbon dioxide into an aqueous solution of sodium silicate containing 68 grams of $SiO_2$ per liter, 20.3 grams of $Na_2O$ per liter, and 20 grams of NaCl per liter, the rate of introduction of said carbon dioxide being sufficient to deliver the theoretical amount of carbon dioxide required to react with the $Na_2O$ of the sodium silicate in 60 minutes, continuing the carbonation for the said period of 60 minutes while maintaining the temperature of said solution at 50° C., and separating the precipitated silica from the solution.

25. A method of preparing finely divided silica which comprises introducing carbon dioxide into an aqueous solution of sodium silicate containing 68 grams of $SiO_2$ per liter and 10 grams of NaCl per liter, the rate of introduction of said carbon dioxide being sufficient to deliver the theoretical amount of carbon dioxide required to react with the $Na_2O$ of the sodium silicate in 180 minutes, continuing the carbonation for the said period of 180 minutes while maintaining the temperature of said solution at 65° C., and separating the precipitated silica from the solution.

26. In a method of treating a finely divided, precipitated silica having a surface area of 25 to 200 square meters per gram, and which has initially been precipitated from an aqueous alkali metal silicate solution and is in the form of finely divided discrete particles, the improvement which comprises stabilizing said silica against change in surface area by subjecting said silica to the action of an aqueous medium at a pH not less than 5 and a temperature of at least 60° C. until the surface area of the silica has been stabilized.

27. The process of claim 1 wherein the acidification agent is ammonium chloride.

28. The process of claim 1 wherein the surface area is 148 square meters per gram.

29. The process of claim 1 wherein the acidification agent is carbon dioxide.

30. The process of claim 1 wherein the solution contains 10 to 100 grams of $SiO_2$ per liter of solution.

References Cited in the file of this patent

UNITED STATES PATENTS

| | | |
|---|---|---|
| 2,438,560 | Kanhofer | May 2, 1944 |
| 2,496,736 | Maloney | Feb. 7, 1950 |
| 2,588,853 | Kumins et al. | Mar. 11, 1952 |
| 2,605,228 | Alexander et al. | July 29, 1952 |
| 2,731,326 | Alexander et al. | Jan. 17, 1956 |

FOREIGN PATENTS

| | | |
|---|---|---|
| 299,483 | Great Britain | Oct. 29, 1928 |
| 561,750 | Great Britain | June 2, 1944 |
| 653,993 | Great Britain | May 30, 1951 |

UNITED STATES PATENT OFFICE
CERTIFICATE OF CORRECTION

Patent No. 2,940,830                      June 14, 1960

Fred S. Thornhill

It is hereby certified that error appears in the above numbered patent requiring correction and that the said Letters Patent should read as corrected below.

Column 2, line 67, for "s" read -- is --; column 3, line 42, for "liter SiO$_2$" read -- liter of SiO$_2$ --; column 4, line 8, for "graps" read -- graphs --; line 26, for "me" read -- be --; column 6, line 10, for "radio" read -- ratio --; column 10, line 2, strike out "product in large batches due to variation", and insert instead -- example, 10 to 30 minutes, slight variations --; column 11, line 53, for "extrated" read -- extracted --; line 67, for "aqueos" read -- aqueous --; line 73, for "bond" read -- bound --; column 15, line 10, for "wtih" read -- with --; column 25, line 44, for "enouch" read -- enough --; column 27, line 7, for "same" read -- sample --; column 28, line 34, for "crabonation" read -- carbonation --; column 30, Table XVI, last column, opposite "Run No. 30" for "2,45" read -- 2,450 --; column 32, line 1, for "heater" read -- heated --; column 34, line 21, for "in" read -- of --; column 35, line 40, for "NaO(SiO$_2$)$_{3.3}$" read -- Na$_2$O(SiO$_2$)$_{3.3}$ --; column 36, line 15, for "introducting" read -- introducing --.

Signed and sealed this 22nd day of October 1963.

(SEAL)
Attest:

ERNEST W. SWIDER
Attesting Officer

EDWIN L. REYNOLDS
Acting Commissioner of Patents